US012258886B2

(12) United States Patent
Ford

(10) Patent No.: US 12,258,886 B2
(45) Date of Patent: Mar. 25, 2025

(54) SYSTEMS AND METHODS FOR GENERATING GAS AND POWER

(71) Applicant: BOUNDARY ENERGY INC., Evansburg (CA)

(72) Inventor: Darrell Ford, Evansburg (CA)

(*) Notice: Subject to any disclaimer, the term of this patent is extended or adjusted under 35 U.S.C. 154(b) by 0 days.

(21) Appl. No.: 18/289,548

(22) PCT Filed: May 11, 2022

(86) PCT No.: PCT/CA2022/050746
§ 371 (c)(1),
(2) Date: Nov. 3, 2023

(87) PCT Pub. No.: WO2022/236419
PCT Pub. Date: Nov. 17, 2022

(65) Prior Publication Data
US 2024/0263568 A1    Aug. 8, 2024

Related U.S. Application Data

(60) Provisional application No. 63/187,850, filed on May 12, 2021.

(51) Int. Cl.
*F01K 25/10* (2006.01)
*F01K 7/32* (2006.01)
*F01K 23/10* (2006.01)
*F02C 3/20* (2006.01)

(52) U.S. Cl.
CPC ............ *F01K 25/103* (2013.01); *F01K 7/32* (2013.01); *F01K 23/10* (2013.01); *F02C 3/20* (2013.01)

(58) Field of Classification Search
CPC .......... F01K 25/103; F01K 7/32; F01K 23/10; F02C 3/20
See application file for complete search history.

(56) References Cited

U.S. PATENT DOCUMENTS

| | | | |
|---|---|---|---|
| 7,882,692 B2* | 2/2011 | Pronske | F25J 3/04018 60/39.182 |
| 9,523,312 B2 | 12/2016 | Allam et al. | |
| 2003/0131582 A1* | 7/2003 | Anderson | F25J 3/04496 60/39.55 |
| 2008/0115500 A1* | 5/2008 | MacAdam | F02C 3/20 60/39.12 |

(Continued)

*Primary Examiner* — Hoang M Nguyen

(57) ABSTRACT

A gas generator has a first and a second piston disposed in, respectively, a first and a second fluid chamber and coupled to, respectively, a first and a second combustion chamber to be actuatable by combustion that expands the respective combustions chambers. The first and second fluid chambers receive liquid $CO_2$ and the combustion chambers receive fuel and oxygen for combustion. The second piston is mechanically coupled to the first piston, such that combustion in the first and second combustion chambers pushes the liquid $CO_2$ from the first and second fluid chambers to, respectively, the second and first combustion chambers while expelling, respectively, the combustion gases and vaporized $CO_2$ (the mixed working fluid) from the first and second combustion chambers to an expander for generating power. The mixed working fluid is supplied to a closed reservoir, from where liquid $CO_2$ is supplied back to the first and second fluid chambers.

25 Claims, 15 Drawing Sheets

(56) References Cited

U.S. PATENT DOCUMENTS

2011/0265474 A1\* 11/2011 Schubert ................ F01K 3/18
  60/676
2017/0058712 A1   3/2017 Allam et al.
2017/0341942 A1\* 11/2017 Harper, Jr. ............. F01K 7/16

\* cited by examiner

SYSTEMS AND METHODS FOR GENERATING GAS AND POWER

This application claims the benefit of, and priority to, U.S. Provisional Patent Application No. 63/187,850, filed on May 12, 2021.

TECHNICAL FIELD

The disclosure relates generally to power generation systems, and more particularly to power generation using hydrocarbon fuels without releasing $CO_2$ emissions.

BACKGROUND

A pressing need exists for improvements in power generation systems to reduce power costs and prevent harmful emissions threatening the climate. For example, improvements to increase power generation efficiencies and prevent greenhouse gas (GHG) emissions into the atmosphere are desirable to help industry maintain competitiveness by tackling rising operating costs, and help society meet the challenge of climate change.

Power generation systems based on the Rankine cycle, and other related cycles, are widespread. In a Rankine cycle-based system, a turbine (or expander) is used to extract power from a hot working fluid generated by heating in a boiler, e.g. superheated steam generated from water. Superheating is used to prevent condensation during expansion in the power generation process, since this may cause degradation of the turbine. After power extraction, the relatively cooler working fluid is condensed in a condenser and fed back to the boiler to repeat the process. One or more pumps may be required to pump the working fluid through the system, e.g. centrifugal pumps, diaphragm pumps, and/or rotor-jet pumps. Pumps may be powered parasitically, i.e. using shaft energy generated by the turbine.

Such power generation systems may waste a considerable amount of heat and may involve other significant types of inefficiencies, e.g. irrecoverable loss of heat in the condenser, and frictional losses in mechanical components.

In Organic Rankine Cycle (ORC)-based power generation systems, organic fluids are used as part of the working fluid. Example working fluids include Chlorofluorocarbons (CFC's) and hydrochlorofluorocarbons (HCFC's), perfluorocarbons (PFCs), and long-chain hydrocarbons such as isobutane, pentane, and propane. Such working fluids have boiling points that are sufficiently low to allow low-grade heat recovery, which facilitates energy harvesting from low heat boilers and from the working fluid after expansion. This low-grade heat may be used to preheat the working fluid before heating in the boiler to achieve greater efficiencies or may be used for other purposes, e.g. for heating water in a cogeneration plant.

ORC-based systems may generate relatively less power than comparable systems using steam. In many cases, ORC-based systems are more costly. The working fluids used in ORC-based systems may be combustible and hazardous to human health. Additionally, the global warming potential (GWP) of the working fluids in ORC-based systems may be considerable. The resultant magnification of the climate impact of leakages of the working fluid may be unacceptably high. Alternative fluids without some of these drawbacks may nonetheless be thermodynamically inappropriate and/or may potentially compromise the structural integrity of turbines and expanders.

SUMMARY

Cleaning up power generation is a leading societal issue today. Increasing alarm over the environmental impact of greenhouse gas (GHG) emissions has put the power generation industry under considerable pressure. Concerns over rising threats to the well-being and livelihoods of communities, due to climate change and associated economic dislocation, have been growing. For example, several countries have declared "net zero" GHG emission targets and are considering levying carbon taxes. Given such circumstances, the demand for more efficient power generation that generates zero or near-zero GHG emissions has increased manyfold. For example, global investment in 2020 targeting "carbon capture, utilization, and sequestration" (or CCUS) technologies reached 2.8 billion USD.

In some aspects, systems and methods for generating gas and power disclosed herein may reduce inefficiencies and may reduce GHG emissions to zero or near-zero, including by reducing parasitic power consumption by pump(s) and generating liquid $CO_2$ as a by-product, which may then be utilized or sequestered. Efficient power generation may be achieved at relatively low operating temperatures, e.g. below 500° F. or 1000° F. In addition to increased safety, lower operating temperatures allow for cost savings in construction and in operation, and reduced risk of generating pollutants such as NOx.

In some aspects, a gas generator (which may also act as a positive-displacement pump) is disclosed that may facilitate efficiency by reducing parasitic power consumption. The gas generator may have relatively simplified construction and may be used to generate working fluid by relying on internal combustion. In some cases, the gas generator may be high-throughput and/or allow substantially continuous pumping. The gas generator may be configured as an internal combustion device comprising pairs of companion cylinders, possibly coupled via a crankshaft. Each pair of companion cylinders interacts with one another and comprises pistons out-of-phase with one another to allow tandem displacement of fluid therethrough.

The systems and methods of generating power may be based on a modified Rankine cycle using a working fluid including $CO_2$. Similar to working fluids in ORC-based systems, the relatively low boiling point of $CO_2$ may allow extraction of low-grade heat, thereby increasing efficiency. At the same time, leakage of $CO_2$ may generally be less of a health and safety hazard compared to working fluids used in ORC systems. Advantageously, using $CO_2$ may allow mixing of combustion products with the working fluid, e.g. if combustion of hydrocarbon fuels takes place in an oxygen-rich environment substantially free of other oxidizers.

Combustion of fuel in a combustion chamber may actuate a piston of the gas generator to draw the working fluid from a (closed) reservoir and pump it through the system, thereby reducing or eliminating direct parasitic loading on output power shaft(s). Efficiency gains may be achieved by powering pumping by combustion directly rather than by first converting combustion energy into shaft energy to power the output power shaft(s), since heat may otherwise be wasted in the intermediate conversion processes.

The combustion used for pumping may heat the working fluid, which may then be supplied to an expander for generating power. Using combustion for pumping and heating may reduce or eliminate heating of the working fluid in a separate boiler or similar heating apparatus. Advantageously, frictional work associated with pumping may also heat the working fluid instead of being lost to the environment.

Combustion may involve igniting a hydrocarbon fuel in the presence of substantially pure oxygen to generate $CO_2$ and/or $H_2O$, which can then be supplied to the expander to extract power therefrom, e.g. by mixing with the working fluid. Efficiency may be improved since the combustion-generated gases ($CO_2$ and/or $H_2O$) may contain considerable heat. In prior art Rankine cycles using hydrocarbon fuels, at least some of this combustion-related heat is lost as the combustion gases are eventually exhausted to the atmosphere, which also leads to harmful climate effects.

To achieve mixing of combustion gases with the working fluid, the hydrocarbon fuel and oxygen may be mixed with the working fluid prior to, during, and/or immediately after combustion. It is found that a high compression ratio may be obtained by mixing liquid $CO_2$ with the hydrocarbon fuel and oxygen into the combustion chamber, since exposure to hot combustion gases may lead to phase transition of the $CO_2$ and an associated large increase in pressure (or volume). The high compression ratio may ensure a favourable pressure gradient of the working fluid and increase efficiency of power generation. A pair of companion pistons may work in tandem to pump working fluid into a pair of fluid chambers and therefrom into a pair of combustion chambers configured to alternatingly combust fuel. Advantageously, control of flow of fuel, oxygen, working fluid, and combustion gases through flow lines may be achieved via check valves, e.g. simple spring-loaded one-way valves (or check valves).

After expansion, the working fluid (including combustion-generated $CO_2$) may be supplied to the reservoir, which prevents release of $CO_2$ into the atmosphere. The fluid mass in the reservoir may increase with time due to the introduction of additional fluids from the combustion, thereby increasing pressure in the reservoir and causing liquefaction of part of the $CO_2$, e.g. due to use of residual pressure in the working fluid after expansion. Efficient density-based separation of fluids and/or liquefaction may be achieved in the reservoir, without requiring cryogenic conditions. Advantageously, substantially pure liquid $CO_2$ may be "tapped off" from the reservoir for further utilization, including for re-use in the power generation cycle. Other fluids may also be similarly "tapped off", e.g. $H_2O$ and contaminants like SOx, e.g. generated due to residual sulphur in hydrocarbon fuel, and NOx, e.g. generated due to residual nitrogen in the oxygen stream.

Advantageously, mixing (hot) combustion gases with the working fluid may reduce harmful cavitation of $CO_2$ in the expander by sufficiently increasing the temperature of the working fluid, e.g. enough to cause complete vaporization prior to expansion and reduce condensation after expansion. Additionally, it is found that using a boundary-layer expander may prevent or mitigate structural failures associated with cavitation of $CO_2$. An example of such a boundary-layer turbine is disclosed in U.S. Pat. No. 10,626, 726 B2 ("Tubular adhesion turbine or pump").

In an aspect, the disclosure describes a gas generator. The gas generator also includes a first fluid chamber connected to a supply of a first fluid to receive a first portion of the first fluid. The gas generator also includes a second fluid chamber connected to the supply of the first fluid to receive a second portion of the first fluid. The gas generator also includes a first combustion chamber connected to a supply of a second fluid to receive a first portion of the second fluid. The gas generator also includes a second combustion chamber connected to the supply of the second fluid to receive a second portion of the second fluid. The gas generator also includes a first piston disposed in the first fluid chamber and coupled to the first combustion chamber for reciprocating motion between the first fluid chamber and the first combustion chamber, the first piston being actuatable to expand the first combustion chamber by combustion in the first combustion chamber. The gas generator also includes a second piston disposed in the second fluid chamber and coupled to the second combustion chamber for reciprocating motion between the second fluid chamber and the second combustion chamber, the second piston being actuatable to expand the second combustion chamber by combustion in the second combustion chamber, the second piston mechanically coupled to the first piston for actuation of the first piston by combustion of the second portion of the second fluid in the second combustion chamber to displace the first portion of the first fluid out of the first fluid chamber into the second combustion chamber while expelling gas in the first combustion chamber, and for actuation of the second piston by combustion of the first portion of the second fluid in the first combustion chamber to displace the second portion of the first fluid out of the second fluid chamber into the first combustion chamber while expelling gas in the second combustion chamber.

Implementations may include one or more of the following features. The gas generator wherein the second fluid includes oxygen, the first fluid is liquid in the first fluid chamber and the second fluid chamber, the first fluid being mixed with the second fluid in the first combustion chamber and the second combustion chamber, and the first fluid vaporizes in the first combustion chamber and the second combustion chamber due to combustion of the second fluid without oxidization of the first fluid. The first fluid is $CO_2$ and the second fluid includes a hydrocarbon fuel for generating $CO_2$ upon combustion and an oxidizer, the first fluid and second fluid being substantially free of oxidizable species other than the hydrocarbon fuel. A system of generating power, comprising: a gas generator according to any one –10; a reservoir including liquid $CO_2$; an expander fluidly connected to the gas generator to receive the gas expelled from the first combustion chamber and the second combustion chamber to generate shaft power using the gas, the expander fluidly connected to the reservoir to supply fluids exhausted from the expander to the reservoir. The system of generating power further comprising: a heat exchanger configured to receive fluids exhausted from the expander for cooling the fluids to generate liquid $CO_2$ to be supplied to the reservoir. The system of generating power further comprising: a booster combustion chamber fluidly connected to the gas generator to receive and heat the gas expelled from the first combustion chamber and the second combustion chamber, the booster combustion chamber fluidly connected to the expander to supply heated gas for generating power, the booster combustion chamber supplied with hydrocarbon fuel and oxygen for combustion to heat the gas. The system of generating power further comprising: a heat exchanger configured to receive fluids exhausted from the expander for cooling the fluids to generate liquid $CO_2$ to be supplied to the reservoir, the gas expelled from the first combustion chamber and the second combustion chamber being preheated using heat from the heat exchanger before being supplied to the booster combustion chamber. The reservoir is configured to separate liquid $CO_2$ from gaseous $CO_2$ by density stratification. The first fluid is $CO_2$ and the supply of the first fluid is the reservoir. The expander is a first expander, further comprising: a second expander fluidly connected to the reservoir to receive $CO_2$ therefrom to relieve excess pressure in the reservoir and to generate power. The system of generating power further comprising: a fuel reservoir, the second fluid including fuel from the fuel reservoir, the power generated by the second expander being used to pressurize the fuel in the fuel reservoir. An operating temperature in the first combustion chamber and the second combustion chamber is less than 1000° F. The gas generator further comprising: a chamber; a first receptacle connected to the chamber; a second receptacle connected to the chamber opposite the first receptacle; and a piston assembly defining the first piston and the second piston, the piston assembly disposed inside the chamber to form two separate spaces in the chamber and slidably engaged with the first receptacle and the second receptacle for reciprocating motion inside the chamber, the two separate spaces defining the first combustion chamber and the second combustion chamber, the first fluid chamber formed in the first receptacle and fluidly separated from the first combustion chamber by the piston assembly, the second fluid chamber formed in the second receptacle and fluidly separated from the second combustion chamber by the piston assembly. The first fluid chamber is fluidly connected to the second combustion chamber, and the second fluid chamber is fluidly connected to the first combustion chamber, the gas generator further comprising: a first piston cylinder for housing the first piston for reciprocating motion therein, the first combustion chamber and the first fluid chamber formed on opposed sides of the first piston inside the first piston cylinder; a second piston cylinder for housing the second piston for reciprocating motion therein, the second combustion chamber and the second fluid chamber formed on opposed sides of the second piston inside the second piston cylinder; and a crankshaft connected to the first piston and the second piston to define a 180° phase difference between a crank throw of the first piston and a crank throw of the second piston, the crankshaft being drivably coupled to the first piston and the second piston to alternatively displace the first portion of the first fluid from the first fluid chamber into the second combustion chamber and displace the second portion of the first fluid from the second fluid chamber into the first combustion chamber. The crankshaft is connected to the third piston and the fourth piston to define a 180° phase difference between a crank throw of the third piston and a crank throw of the fourth piston, the crankshaft being drivably coupled to the third piston and the fourth piston to alternatively displace a third portion of the first fluid from the third fluid chamber into the fourth combustion chamber and displace a fourth portion of the first fluid from the fourth fluid chamber into the third combustion chamber. The gas generator further comprising: one or more valves connected to the supply of the first fluid and the supply of the second fluid to draw in the first portion of the first fluid into the first fluid chamber, the second portion of the first fluid into the second fluid chamber, the first portion of the second fluid into the first combustion chamber, and the second portion of the second fluid into the second combustion chamber. The one or more valves are configured to hinder reverse flow to the supply of the first fluid from the first fluid chamber and the second fluid chamber. The one or more valves include a first one-way valve to allow the first fluid from the first fluid chamber into the second combustion chamber and to hinder flow from the second combustion chamber to the first fluid chamber; and a second one-way valve to allow the first fluid from the second fluid chamber into the first combustion chamber and to hinder flow from the first combustion chamber to the second fluid chamber. Implementations of the described techniques may include hardware, a method or process, or computer software on a computer-accessible medium.

In an aspect, the disclosure describes a system for generating power. The system also includes a reservoir including liquid $CO_2$. The system also includes a gas generator including. The system also includes a fluid chamber supplied with liquid $CO_2$. The system also includes a combustion chamber supplied with liquid $CO_2$, hydrocarbon fuel, and oxygen for combustion to generate pressurized gas including gaseous $CO_2$. The system also includes a piston actuatable by combustion in the combustion chamber to cause reciprocating motion of the piston to displace liquid $CO_2$ out of the fluid chamber. The system also includes an expander fluidly connected to the gas generator to receive the pressurized gas from the gas generator and fluidly connected to the reservoir to supply fluids exhausted from the expander to the reservoir, the expander configured to generate power using the pressurized gas.

Implementations may include one or more of the following features. The system for generating power wherein the fluid chamber is a first fluid chamber, the combustion chamber is a first combustion chamber, the piston is a first piston, and the gas generator further includes: a second fluid chamber, a second combustion chamber supplied with liquid $CO_2$ from the first fluid chamber, hydrocarbon fuel, and oxygen for combustion to generate pressurized gas including gaseous $CO_2$, and a second piston actuatable by combustion in the second combustion chamber to cause reciprocating motion to displace liquid $CO_2$ out of the second fluid chamber into the first combustion chamber. The system for generating power further comprising: a heat exchanger configured to receive fluids exhausted from the expander for cooling to generate liquid $CO_2$ to be supplied to the reservoir The system for generating power further comprising: a booster combustion chamber fluidly connected to the gas generator to receive pressurized gas and fluidly connected to the expander to supply heated pressurized gas for generating power, the booster combustion chamber supplied with hydrocarbon fuel and oxygen for combustion to heat the pressurized gas received from the gas generator. Implementations of the described techniques may include hardware, a method or process, or computer software on a computer-accessible medium.

In an aspect, the disclosure describes a method of generating power. The method of generating power also includes receiving hydrocarbon fuel and oxygen in a combustion chamber. The method of generating power also includes causing of combustion of the hydrocarbon fuel in the combustion chamber using the oxygen to generate mixed working gas. The method of generating power also includes supplying the mixed working gas to an expander to generate power. The method of generating power also includes receiving the mixed working gas from the expander into a closed reservoir to increase a pressure of the closed reservoir.

Implementations may include one or more of the following features. The method further comprising: receiving liquid $CO_2$ in the combustion chamber from the closed reservoir to mix the hydrocarbon fuel and the oxygen with the liquid $CO_2$ in the combustion chamber, the closed reservoir being pressurized, and wherein causing combustion of the hydrocarbon fuel in the combustion chamber generates combustion gas, the combustion gas vaporizing and mixing with the liquid $CO_2$ to generate the mixed working gas. The method of generating power further comprising: separating liquid $CO_2$ from gaseous $CO_2$ in the closed reservoir by density stratification. The method of generating power further comprising: supplying fluids from the closed reservoir to a second expander to reduce pressure in the closed reservoir and to generate power. The method of generating power further comprising: using the power generated by the second expander to pressurize at least one of the hydrocarbon fuel and the oxygen upstream of the combustion chamber. The method of generating power further comprising: using the power generated by the second expander to drive a pump to draw the hydrocarbon fuel from a fuel reservoir into the combustion chamber; drawing the oxygen from an oxidizer reservoir into the combustion chamber, the oxidizer reservoir being pressurized relative to the combustion chamber. The method of generating power further comprising: mixing combustion gas generated in a booster combustion chamber with the mixed working gas, upstream of the expander; The method of generating power further comprising: using heat from the mixed working gas, upstream of the closed reservoir and downstream of the expander, to preheat the mixed working gas upstream of the booster combustion chamber. The method of generating power further comprising: using pressure swing adsorption to generate the oxygen from air; supplying the oxygen to an oxidizer reservoir, the oxidizer reservoir being pressurized relative to the combustion chamber; and drawing the oxygen from the oxidizer reservoir into the combustion chamber. The combustion chamber is a first combustion chamber, the mixed working gas is a first portion of mixed working gas, the closed reservoir being pressurized, the method further comprising: receiving hydrocarbon fuel and oxygen in a second combustion chamber; causing combustion of the hydrocarbon fuel in the second combustion chamber using the oxygen in the second combustion chamber to generate a second portion of mixed working gas; receiving liquid $CO_2$ in a first fluid chamber from the closed reservoir; receiving liquid $CO_2$ in a second fluid chamber from the closed reservoir; actuating a first piston by combustion in the first combustion chamber to push liquid $CO_2$ from the first fluid chamber into the second combustion chamber; actuating a second piston by combustion in the second combustion chamber to push liquid $CO_2$ from the second fluid chamber into the first combustion chamber; and wherein causing combustion of the hydrocarbon fuel in the first combustion chamber generates a first portion of combustion gases that vaporizes and mixes with liquid $CO_2$ in the first combustion chamber to generate the first portion of the mixed working gas, and causing combustion of the hydrocarbon fuel in the second combustion chamber generates a second portion of combustion gases that vaporizes and mixes with liquid $CO_2$ in the second combustion chamber to generate the second portion of the mixed working gas. Implementations of the described techniques may include hardware, a method or process, or computer software on a computer-accessible medium.

In an aspect, the disclosure describes a method of generating gas. The method of generating gas also includes receiving hydrocarbon fuel and oxygen in a first combustion chamber. The method of generating gas also includes receiving liquid $CO_2$ in the first combustion chamber to mix the liquid $CO_2$ with the hydrocarbon fuel and the oxygen. The method of generating gas also includes receiving liquid $CO_2$ in a first fluid chamber. The method of generating gas also includes causing combustion of the hydrocarbon fuel in the first combustion chamber using the oxygen in the first combustion chamber to vaporize the liquid $CO_2$ in the first combustion chamber and to generate a first portion of combustion gases for mixing with vaporized $CO_2$ in the first combustion chamber to generate a first portion of mixed working fluid. The method of generating gas also includes actuating a first piston by combustion in the first combustion chamber to push liquid $CO_2$ from the first fluid chamber into a second combustion chamber. The method of generating gas also includes receiving hydrocarbon fuel and oxygen in the second combustion chamber to mix the hydrocarbon fuel and the oxygen in the second combustion chamber with the liquid $CO_2$ in the second combustion chamber. The method of generating gas also includes receiving liquid $CO_2$ in a second fluid chamber. The method of generating gas also includes causing combustion of the hydrocarbon fuel in the second combustion chamber using the oxygen in the second combustion chamber to vaporize the liquid $CO_2$ in the second combustion chamber and to generate a second portion of combustion gases for mixing with vaporized $CO_2$ in the second combustion chamber to generate a second portion of mixed working fluid. The method of generating gas also includes actuating a second piston by combustion in the second combustion chamber to push liquid $CO_2$ from the second fluid chamber into the first combustion chamber.

Implementations may include one or more of the following features. The method of generating gas wherein the first piston and the second piston are integrally coupled to each other. The first piston and the second piston are coupled to each other by a crankshaft. Implementations of the described techniques may include hardware, a method or process, or computer software on a computer-accessible medium.

In some aspects, the disclosure describes a positive-displacement pump powered by internal combustion, comprising: a fluid chamber; a combustion chamber; one or more valves configured to draw in first fluid into the fluid chamber and second fluid into the combustion chamber; and a piston disposed in the fluid chamber and the combustion chamber for reciprocating motion between the fluid chamber and the combustion chamber, the piston actuatable by combustion of the second fluid in the combustion chamber to displace the first fluid out of the fluid chamber.

In some aspects, the disclosure describes a positive-displacement pump wherein the combustion chamber is a first combustion chamber, the fluid chamber is a first fluid chamber, and the piston is a first piston, the positive-displacement pump further comprising: a second fluid chamber, the one or more valves configured to draw in the first fluid into the second fluid chamber; a second combustion chamber, the one or more valves configured to draw in the second fluid into the combustion chamber; and a second piston disposed in the second fluid chamber and the second combustion chamber for reciprocating motion between the second fluid chamber and the second combustion chamber, the second piston actuatable by combustion of the second fluid in the combustion chamber to displace the first fluid out of the second fluid chamber into the first combustion chamber, the second piston drivably coupled to the first piston out-of-phase with the first piston to facilitate displacement of the first fluid out of the second fluid chamber into the first combustion chamber.

In some aspects, the first fluid is liquid when displaced out of the second fluid chamber into the first combustion chamber and is vaporized in the first combustion chamber due to combustion of the second fluid in the first combustion chamber, the first fluid including $CO_2$ and the second fluid including oxygen for combustion. In some aspects, the second fluid includes a hydrocarbon fuel for generating $CO_2$ upon combustion, the first fluid and second fluid being substantially free of oxidizable species other than the hydrocarbon fuel. In some aspects, an operating temperature in the second combustion chamber does not exceed 1000° F. In some aspects, the positive-displacement pump includes a chamber. In some aspects, the positive-displacement pump includes a first receptacle connected to the chamber. In some aspects, the positive-displacement pump includes a second receptacle connected to the chamber opposite the first receptacle.

In some aspects, the positive-displacement pump includes a piston assembly defining the first piston and the second piston, the piston assembly disposed inside the chamber to form two separate spaces in the chamber and slidably engaged with the first receptacle and the second receptacle for reciprocating motion inside the chamber, the two separate spaces defining the first combustion chamber and the second combustion chamber, the first fluid chamber formed in the first receptacle and fluidly separated from the first combustion chamber by the piston assembly, the second fluid chamber formed in the second receptacle and fluidly separated from the second combustion chamber by the piston assembly.

In some aspects, the positive-displacement pump includes a first piston cylinder housing the first piston for reciprocating motion, the first combustion chamber and the first fluid chamber formed on opposed sides of the first piston inside the first piston cylinder. In some aspects, the positive-displacement pump includes a second piston cylinder housing the second piston for reciprocating motion, the second combustion chamber and the second fluid chamber formed on opposed sides of the second piston inside the second piston cylinder. In some aspects, the positive-displacement pump includes a crankshaft connected to the first piston and the second piston to define a 180° phase difference between a crank throw of the first piston and a crank throw of the second piston.

In some aspects, the first fluid chamber is fluidly connected to the second combustion chamber. In some aspects, the second fluid chamber is fluidly connected to the first combustion chamber. In some aspects, the crankshaft is drivably coupled to the first piston and the second piston to alternatively displace the first fluid from the first fluid chamber into the second combustion chamber and displace the first fluid from the second fluid chamber into the first combustion chamber.

In some aspects, the one or more valves include a first one-way valve to allow the first fluid from the first fluid chamber into the second combustion chamber and to hinder flow from the second combustion chamber to the first fluid chamber. In some aspects, the one or more valves include a second one-way valve to allow the first fluid from the second fluid chamber into the first combustion chamber and to hinder flow from the first combustion chamber to the second fluid chamber.

In another aspect, the disclosure describes a method of pumping working fluid in a power generation system, the method comprising: receiving fuel and oxidizer to a combustion chamber; receiving liquid working fluid into the combustion chamber, the liquid working fluid being non-oxidizable relative to the fuel; combusting fuel and oxidizer in the combustion chamber to vaporize the liquid working fluid in the combustion chamber and to actuate a piston to push liquid working fluid out of a fluid chamber; and after combusting fuel and oxidizer in the combustion chamber, supplying gases from the combustion chamber to an expander for power generation.

In some aspects, the disclosure describes a method of pumping working fluid in a power generation system, further comprising: receiving the liquid working fluid pushed out of the fluid chamber into a companion combustion chamber; and vaporizing the liquid working fluid in the companion combustion chamber by combusting additional fuel and additional oxidizer to actuate a piston to push liquid working fluid out of a companion fluid chamber towards the combustion chamber.

In some aspects, the method includes receiving the liquid working fluid pushed out of the fluid chamber into a companion combustion chamber. In some aspects, the method includes vaporizing the liquid working fluid in the companion combustion chamber by combusting additional fuel and additional oxidizer to actuate a piston to push liquid working fluid out of a companion fluid chamber towards the combustion chamber.

In yet another aspect, the disclosure describes a method of generating power, comprising: supplying a liquid working fluid to a combustion chamber; supplying reactants to the combustion chamber for combustion; combusting the reactants in the combustion chamber to generate hot combustion gases for mixing with the working fluid and to vaporize the working fluid; after vaporizing the working fluid, generating power by using a turbine to extract energy from the working fluid and the combustion gases; and condensing at least a portion of the working fluid and the combustion gases.

In some aspects, the disclosure describes a method of generating power, wherein the combustion chamber is a first combustion chamber, further comprising: supplying the liquid working fluid to a second combustion chamber using a piston actuated by combustion of the reactants in the first combustion chamber; supplying the reactants to the second combustion chamber for combustion:

and combusting the reactants in the second combustion chamber to generate hot combustion gases for mixing with the working fluid in the second combustion chamber and to vaporize the working fluid in the second combustion chamber.

In some aspects, the combustion chamber is a first combustion chamber. In some aspects, the method includes supplying the liquid working fluid to a second combustion chamber using a piston actuated by combustion of the reactants in the first combustion chamber. In some aspects, the method includes supplying the reactants to the second combustion chamber for combustion. In some aspects, the method includes combusting the reactants in the second combustion chamber to generate hot combustion gases for mixing with the working fluid in the second combustion chamber and to vaporize the working fluid in the second combustion chamber. In some aspects, the piston is a first piston. In some aspects, supplying a liquid working fluid to the first combustion chamber includes using a second piston actuated by combustion of the reactants in the second combustion chamber to displace liquid working fluid into the first combustion chamber. In some aspects, the working fluid includes $CO_2$. In some aspects, the method includes after mixing the working fluid and the combustion gases, separating components of the working fluid and the combustion gases by density stratification.

In a further aspect, the disclosure describes a system for generating shaft power, comprising: a reservoir including liquid $CO_2$; a pump including a fluid chamber supplied with liquid $CO_2$, a combustion chamber supplied with liquid $CO_2$, hydrocarbon fuel, and oxygen for combustion to generate pressurized gas including gaseous $CO_2$, a piston actuatable to displace liquid $CO_2$ out of the fluid chamber by combustion in the combustion chamber; and a turbine fluidly connected to the pump to receive the pressurized gas from the pump and fluidly connected to the reservoir to supply fluids exhausted from the turbine to the reservoir, the turbine configured to generate shaft power using the pressurized gas.

In some aspects, the disclosure describes a system for generating shaft power wherein the fluid chamber is a first fluid chamber, the combustion chamber is a first combustion chamber, the piston is a first piston, and the pump further includes: a second fluid chamber, a second combustion chamber supplied with liquid $CO_2$ from the first fluid chamber, hydrocarbon fuel, and oxygen for combustion to generate pressurized gas including gaseous $CO_2$, and a second piston actuatable to displace liquid $CO_2$ out of the second fluid chamber into the first combustion chamber by combustion in the second combustion chamber.

In yet another further aspect, the disclosure describes a method of generating power, comprising: receiving hydrocarbon fuel and oxygen in a combustion chamber; oxidizing the hydrocarbon fuel in the combustion chamber using the oxygen in the absence of other oxidizers to generate combustion gas, the combustion gas including at least one of $CO_2$ or $H_2O$; mixing the combustion gas with working fluid supplied from a closed reservoir to generate mixed working gas, the working fluid including at least one of $CO_2$ or $H_2O$; supplying the mixed working gas to an expander to generate power; and receiving the mixed working gas from the expander into the closed reservoir.

In some aspects, the method further includes supplying fluids from the closed reservoir to reduce pressure in the closed reservoir to another expander for generating power.

Embodiments can include combinations of the above features. Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure relates to power generation systems and methods. In some embodiments, the systems and methods disclosed herein can facilitate more efficient and environmentally friendly power generation compared to existing prior systems.

Aspects of various embodiments are described in relation to the figures.

Figure 1:
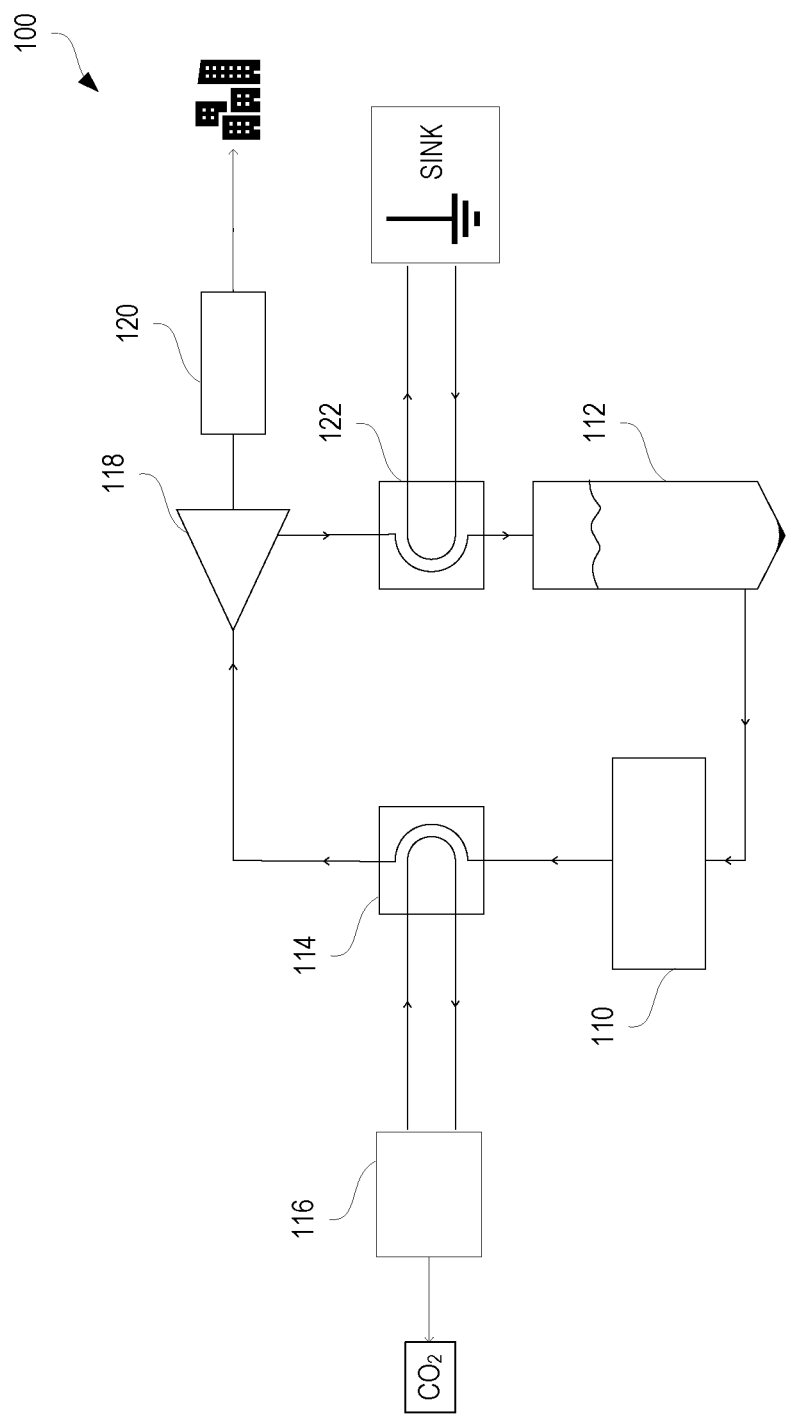
FIG. 1 is a schematic of a prior art Rankine cycle-based power generation system.

FIG. 1 is a schematic of a prior art Rankine cycle-based power generation system 100. A pump 110 draws working fluid from a reservoir 112 into a heat exchanger 114. The heat exchanger 114 supplies heat to the working fluid using a boiler 116. The boiler 116 may use hydrocarbon fuels, thereby generating $CO_2$ emissions.

The hot (energized) working fluid from the heat exchanger 114 is supplied to an expander 118 or turbine. A generator 120 may draw shaft work off of the expander 118, e.g. to generate electricity. After expansion in the expander 118, the working fluid is cooled in a condenser 122 and returned to the reservoir 112. Heat extracted in the condenser 122 may be lost or utilized for other purposes, e.g. cogeneration (see SINK in FIG. 1).

Figure 2:
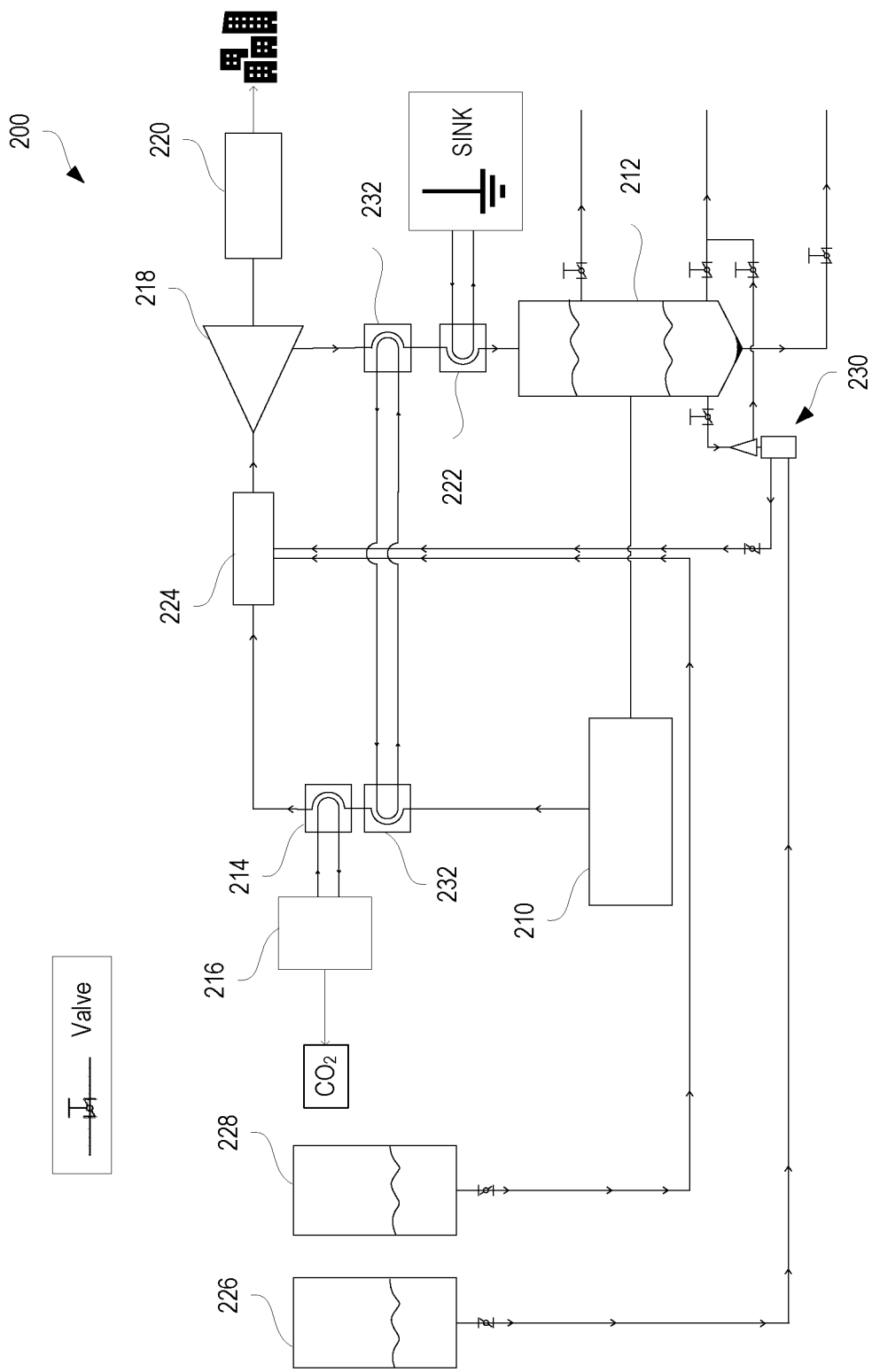
FIG. 2 is a schematic of a modified Rankine cycle-based power generation system, in accordance with an embodiment.

FIG. 2 is a schematic of a modified Rankine cycle-based power generation system 200, in accordance with an embodiment.

The system 200 may operate using $CO_2$ as a working fluid, stored in a reservoir 212. The reservoir may be pressurized and/or cooled (e.g. to cryogenic temperatures) to establish a multiphase $CO_2$ volume in the reservoir 212 that is density stratified. Liquid phase $CO_2$ in the reservoir 212 may be substantially separated from gaseous phase $CO_2$. The reservoir 212 may be closed, i.e. not exposed to the ambient atmosphere except via (controlled) inlets and outlets.

Liquid $CO_2$ may be drawn from the reservoir 212 by the pump 210 into a heat exchanger 214 connected to a heating device for heating, such as a boiler 216. In some embodiments, the pump 210 may be a gas generator that is configured to draw fluids through at least partially without the aid of a pump and/or compressor, e.g. the pump 210 may be self-pumping gas generator. In various embodiments, the liquid $CO_2$ supplied from the reservoir 212 may be relatively close to its boiling point or phase transition point before and/or after heating in the heat exchanger 214. The boiler 216 may generate $CO_2$ emissions.

Additional heating of the working fluid may be provided in a booster 224. The booster 224 may be a boiler or other heating apparatus configured to provide heat to the working fluid and/or augment the working fluid's mass. In some embodiments, the booster 224 may be a primary heating apparatus, i.e. the boiler 216 may be absent or providing relatively small amounts of heating. In various embodiments, the working fluid flowing from the booster 224 may be relatively hot and substantially fully vaporized.

As referred to herein, vaporization refers to the process of changing phase from liquid phase, e.g. to gaseous phase or to a gas-like supercritical phase. For example, in some embodiments, a gas-like supercritical phase may be at least partially defined by Fisher-Widom or Frenkel lines.

The booster 224 may be supplied with hydrocarbon fuel from a fuel reservoir 226 and oxidizer, e.g. substantially pure $O_2$, from an oxidizer reservoir 228. As referred to herein, hydrocarbon fuel may include $H_2$. In some cases, the oxidizer reservoir 228 may be an oxygen generating device, e.g. a pressure swing adsorption (PSA) device. Similarly, in some cases, the fuel reservoir 226 may be a fuel generating device, e.g. a natural gas processing device.

The booster 224 may generate heat and substantially pure $H_2O$ and/or $CO_2$ by combusting the hydrocarbon fuel in the presence of the oxidizer, e.g. oxidizing the $CH_4$ (or other hydrocarbon fuel) in a combustion chamber using oxygen in the absence of other oxidizers to generate combustion gas including at least one of $CO_2$ or $H_2O$. In some embodiments, the $H_2O$ and/or $CO_2$ generated by the booster 224 may be mixed in with the working fluid to generated mixed working gas that is hot and pressurized.

The working fluid from the booster 224, comprising $CO_2$ supplied from the reservoir 212 and combustion gases generated in the booster 224 (mixed working fluid), is supplied to an expander 218 or turbine, e.g. a boundary-layer turbine. A generator 120 may draw shaft work off of the expander 118.

After expansion in the expander 118, the working fluid is cooled in a condenser 222 and returned to the reservoir 212. As alluded to earlier, density-based separation may be used to separate $CO_2$ and $H_2O$ in the reservoir 212.

In various embodiments, even after expansion in the expander 218, the working fluid may have a high pressure relative to the atmospheric pressure (residual pressure in the working fluid) because the expander 218 may be incapable of efficiently extracting power from the working fluid when it is not sufficiently pressurized. As explained below, this residual pressure may be used to advantage by allowing pressurization of the downstream reservoir 212 without inducing flow reversal of the working fluid between the reservoir 212 and the expander 218 and/or reducing efficiency of the expander 218.

In some embodiments, the mass of fluid in the reservoir 212 may increase over time due to incorporation of combustion gases generated in the booster 224. Increased pressure in the reservoir 212 may encourage formation of a non-cryogenic multiphase fluid. For example, a portion of $CO_2$ may be liquefied at substantially ambient or higher-than-cryogenic temperatures. The proportion of $CO_2$ so liquefied may depend on the vapour pressure.

Due to residual pressure in the working fluid after expansion in the expander 218, the pressure in the reservoir 212 may be increased, to a limit, above atmospheric pressure without causing flow reversal or loss of efficiencies with respect to power generation. Efficient liquefaction and component-wise separation of the working fluid may be achieved. Excess fluids may be tapped off from the reservoir 212 via valve-equipped flow lines, e.g. when the pressure in the reservoir 212 leads to loss of efficiency in the expander 218.

In some embodiments, inefficiencies associated with over-pressurization of the reservoir 212 and/or the fuel reservoir 226 may be reduced by using a turbomachine assembly 230. In various embodiments, the turbomachine assembly 230 may include an expander and/or a pump.

Excess pressure in the reservoir 212 may be used to operate the turbomachine assembly 230 to extract energy from pressurized working fluid in the reservoir 212. For example, instead of fluids being tapped off directly from the reservoir 212, they may first be supplied to the turbomachine assembly 230 to drive a rotor to generate power. The turbomachine assembly 230 may then release the fluids. In some embodiments, the turbomachine assembly 230 may be or may include a (second) expander configured to generate shaft power by using the excess pressure in the reservoir 212.

In some cases, the turbomachine assembly 230 may be used to pump fluid out of the reservoir 212.

Similarly, in some embodiments, excess pressure in the fuel reservoir 226 may be used to drive the rotor to generate power. For example, natural gas wells may operate at 1000 psi or more, and natural gas transportation infrastructure may operate at 1000 psi or more. In another example, the fuel reservoir 226 may be (part of) a natural gas well generating excess natural gas. Instead of venting such natural gas to the atmosphere, it may be used to generate power. Advantageously, such "pre-compression" may be used to increase efficiency of the overall system. A need for reducing fuel pressure for use during operation may be reduced or eliminated.

In some embodiments, the pressure in the fuel reservoir 226 may be low. The turbomachine assembly 230 may be used to pressurize the fuel before supplying it to the booster 224.

In various embodiments, inefficiencies associated with heat loss in the condenser 222 may be reduced by use of a recuperator 232 to preheat the working fluid (liquid $CO_2$ from the reservoir 212). The recuperator 232 may be a heat exchanger configured to transfer residual heat in the working fluid, after expansion, to the working fluid before it enters the heat exchanger 214 and the booster 224. Efficiency gains may be realized by reducing thermal loading with respect to the condenser 222, the heat exchanger 214 and/or the booster 224. In some embodiments, the recuperator 232 may be reduce or eliminate cooling in the condenser 222. In some example cases, the recuperator 232 may be used in lieu of the condenser 222.

A plurality of valves may be used to control flow of fuel from the fuel reservoir 226, oxidizer from the oxidizer reservoir 228, and/or fluid(s) in and out of the reservoir 212. For example, a first valve may be used to draw contaminants out of the reservoir 212, a second valve may be used to draw $CO_2$ out of the reservoir, a third valve may be used to draw $CO_2$ out of the reservoir 212 towards the turbomachine assembly 230, and/or a fourth valve may be used to draw $H_2O$ out of the reservoir.

Figure 3:
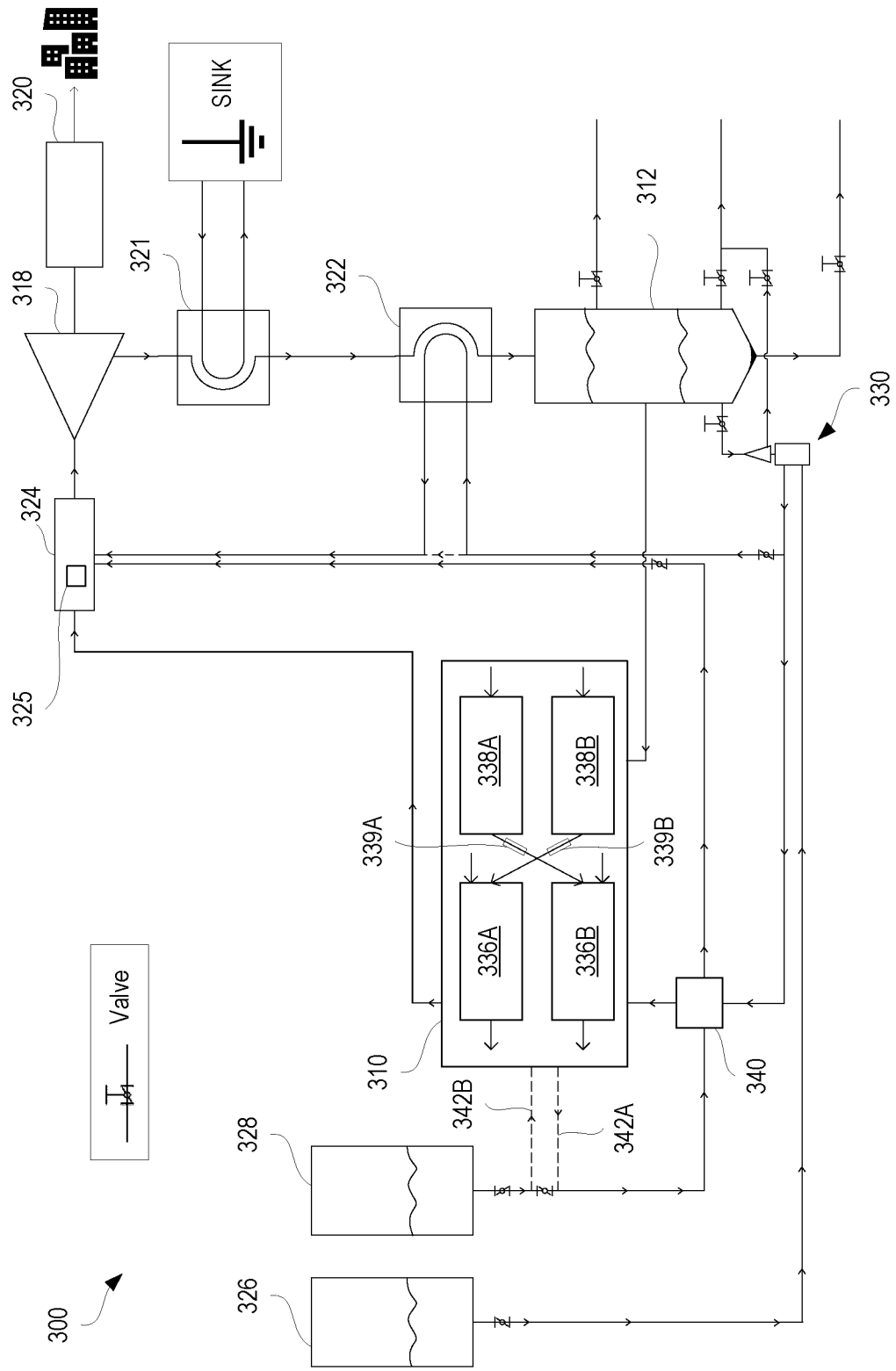
FIG. 3 is a schematic of a power generation system, in accordance with an embodiment.

FIG. 3 is a schematic of a power generation system 300, in accordance with an embodiment.

In some aspects, the system 300 may be similar to the system 200 of FIG. 2.

The system 300 may have a reservoir 312 for receiving working fluid including $CO_2$ for density based-separation. The working fluid may be heated in a booster 324 using fuel from a fuel reservoir 326 and oxidizer from an oxidizer reservoir 328. The working fluid may be $CO_2$, a mixture of $CO_2$ and $H_2O$, $H_2O$, or some other fluid that is non-oxidizable, by the oxidizer, relative to the fuel.

An expander 318 may be configured to generate (shaft) power using the pressurized gas. For this purpose, a generator 320 may be coupled to an expander 318 configured to receive pressurized working fluid. The expander 318 may be fluidly connected to the reservoir 312 to supply fluids exhausted from the expander 318 to the reservoir 312.

In some embodiments, working fluids exhausted from the expander 318 may have excess heat that may need to be removed. In various embodiments, the working fluids may be received in and cooled by one or more heat exchangers, after expansion. In some embodiments, the one or more heat exchangers may generate liquid $CO_2$ to be supplied to the reservoir 312.

A heat exchanger 321 may cool the working fluid after expansion by releasing excess heat to a thermal sink, e.g. the ambient atmosphere. A heat exchanger 322 may be coupled to a fuel line supplying fuel to the booster 324 to act has a heat recuperator to increase overall system efficiency. The heat exchanger 322 may preheat the fuel being supplied to the booster 324 using excess heat in the working fluid. In various embodiments, one or both of the heat exchangers 321, 322 may be used for cooling the working fluid. In some cases, the heat exchanger 322 may be used to preheat fuel being supplied to the gas generator 310. In various embodiments, 50-60% of excess heat may be recovered for preheating fuel.

A heat exchanger 322 may be configured to receive (working) fluids exhausted from the expander 318 for cooling. In some embodiments, the heat exchanger 322 may generate liquid $CO_2$ to be supplied to the reservoir 312.

A gas generator 310 powered by internal combustion may be used for pumping working fluid in the power generation system 300, e.g. as an embodiment of the positive-displacement pump 210.

The gas generator 310 may draw working fluid from the reservoir 312 to the booster 324 by displacing a piston configured to push the working fluid through the system 300.

The booster 324 may have a combustion chamber (booster combustion chamber 325) fluidly connected to the gas generator 310 to receive pressurized gas. The booster combustion chamber 325 may be supplied with hydrocarbon fuel and oxygen for combustion to heat the pressurized gas received from the gas generator 310.

The expander 318 may be fluidly connected to the gas generator 310 to receive the pressurized gas from the gas generator 310, e.g. via the booster 324. The booster combustion chamber 325 may be fluidly connected to the expander 318 to supply heated pressurized gas for generating power.

The gas generator 310 may include combustion chambers 336A, 336B and fluid chambers 338A, 338B. The combustion chambers 336A, 336B respectively may be coupled to the fluid chambers 338A, 338B via reciprocating pistons. The combustion chambers 336A, 336B may be in fluid communication with the respective fluid chambers 338B, 338A. One-way valves may allow flow (of liquid working fluid) from the fluid chambers 338A, 338B to the respective combustion chambers 336B, 336A while hindering, mitigating, and/or preventing flow (reverse flow) from the combustion chambers 336A, 336B to the respective fluid chambers 338B, 338A.

The pistons may be disposed in the respective fluid chambers 338A, 338B and coupled to the first combustion chambers 336A, 336B (e.g. by directly sitting therein or by being mechanical coupled thereto via a coupler and/or other device) for reciprocating motion between the respective fluid chambers 338A, 338B and the respective combustion chambers 336A, 336B. The pistons may be actuatable to expand the respective combustion chambers 336A, 336B by combustion therein.

The combustion chambers 336A, 336B may be connected to a supply (such as the reservoir(s) 326, 328) of a second fluid(s) (e.g. oxidizer and/or fuel) to receive corresponding portions of the second fluid. The fluid chambers 338A, 338B may be connected to a supply (such as the reservoir 312) of a first fluid to receive corresponding portions of the first fluid. e.g. liquid $CO_2$.

One or more valves, e.g. one-way valves, may be configured to hinder reverse flow to reservoir 312 (the supply of liquid working fluid) from the fluid chambers 338A, 338B, and to the reservoirs 326, 328 from the combustion chambers 336A, 336B.

The combustion chambers 336A, 336B may be supplied with (or receive) respective portions of reactants for combustion; fuel from the fuel reservoir 326 and oxidizer from the oxidizer reservoir 328 may be supplied to the gas generator 310. In various embodiments, the fuel may be a hydrocarbon fuel and the oxidizer may be oxygen. In some embodiments, the fluid chambers 338A, 338B may be supplied with liquid $CO_2$ (liquid working fluid) from the reservoir 312.

In various embodiments, the combustion chambers 336A, 336B may be configured generate relatively hot, pressurized gas including gaseous $CO_2$ by combusting the reactants in the combustion chambers 336A, 336B to generate hot combustion gases. In various embodiments, the hot combustion gases may mix with the working fluid.

In some embodiments, liquid working fluid may be supplied to the combustion chambers 336A, 336B. For example, one or more of the fluid chambers 338A, 338B may be supplied to one or more of the combustion chambers 336A, 336B. In some embodiments, pressurized gas may be generated by vaporizing the liquid working fluid in the combustion chambers 336A, 336B. e.g. by mixing the liquid working fluid with the combustion gases. In some embodiments, liquid working fluid may be supplied to the combustion chambers 336A, 336B before combustion takes place for mixing with combustion reactants. In some embodiments, liquid working fluid may be mixed with combustion gases after combustion. For example, combustion may operate the gas generator 310 to push liquid working fluid into the combustion chamber with hot combustion gases.

The gas generator 310 may generate pumping by the combustion. Combustion in the combustion chambers 336A, 336B may actuate the respective piston(s) that then displace working fluid out of the corresponding fluid chambers 338A, 338B. In some example embodiments, the displaced working fluid is supplied to the booster 324 for heating. In some embodiments, the working fluid is first heated by combustion gases generated in the combustion chambers 336A, 336B.

After combustion, gases (including vaporized working fluid) from the combustion chambers 336A, 336B may be used in an expander for power generation. For example, energy may be extracted from the working fluid and the combustion gases using a boundary-layer turbine. After expansion, in some embodiments, at least a portion of the working fluid and the combustion gases may be condensed in the heat exchangers 321, 322. In some embodiments, components of the mixed working fluid and combustion gases may be separated by density stratification in the reservoir 312.

In some embodiments, the combustion chambers 336A, 336B and the fluid chambers 338A, 338B may be companion combustion chambers and companion fluid chambers, respectively, and may work cooperatively or interactively. In some embodiments, the reciprocating pistons mentioned previously may be used to achieve cooperation. In various embodiments, the pistons may be actuatable to displace liquid working fluid from the fluid chambers 338A, 338B into respective combustion chamber 336B, 336A (into the respective companion combustion chamber).

For example, liquid working fluid (e.g. liquid $CO_2$) may be pushed out of the fluid chamber 338A into the (companion) combustion chamber 336B. The liquid working fluid may be so supplied from the fluid chamber 338A by using a piston 339A actuated by combustion of the reactants in the combustion chamber 336A. Similarly, liquid working fluid may be pushed out of the fluid chamber 338B into the (companion) combustion chamber 336A. The liquid working fluid may be so supplied from the fluid chamber 338B by using a piston 339B actuated by combustion of the reactants in the combustion chamber 336B.

The piston 339A and the piston 339B may be mechanically coupled. The pistons 339A, 339B may be actuated by combustion of portions of fluid and oxidizer in the respective combustion chambers 336B, 336A to displace portions of liquid working fluid out of the respective fluid chambers 338A, 338B while expelling gas (e.g. combustion gases and vaporized working fluid) from the combustion chambers 336A, 336B.

In some embodiments, heating provided by the gas generator 310 may reduce or eliminate a need for heating in the booster 324. For example, in some embodiments, there may be no booster used and the working fluid may be supplied directly from the gas generator 310 to the expander 318. In various embodiments, combining heating and pumping may lead to improved efficiencies.

In some embodiments, power may be extracted from to supplied to the gas generator 310 via couplers 342A, 342B. For example, the couplers 342A, 342B may include a power shaft.

In some embodiments, a mixing valve 340 may be used for mixing fuel and oxidizer before supplying to the gas generator 310 and/or the booster 324.

In some embodiments, inefficiencies associated with over-pressurization may be reduced by using a turbomachine assembly 330 (see also turbomachine assembly 230 in FIG. 2). In various embodiments, the turbomachine assembly 330 may include an expander and/or a pump.

Figure 4A:
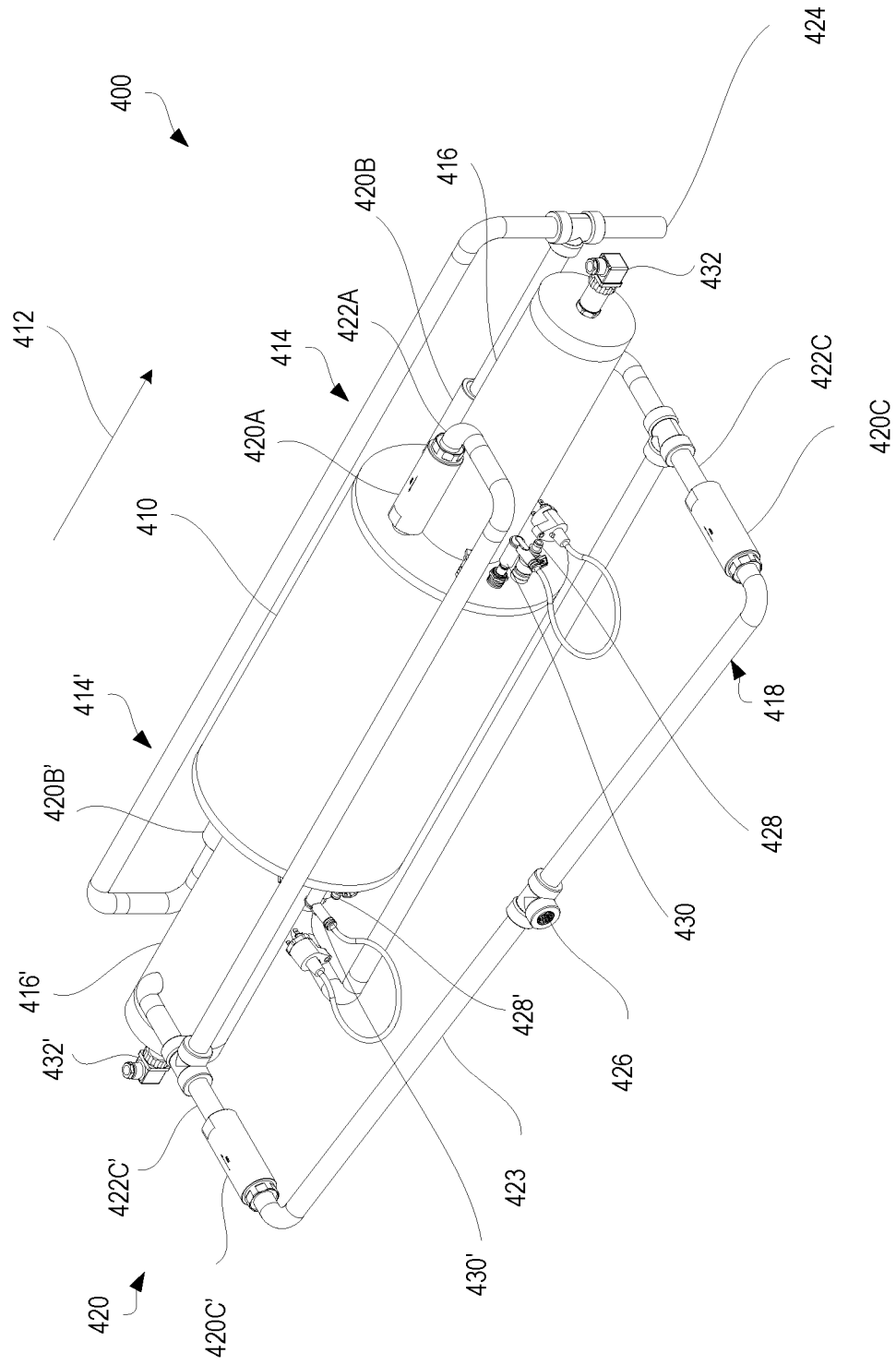
FIG. 4A is a perspective view of a gas generator, in accordance with an embodiment.

FIG. 4A is a perspective view of a gas generator 400 (a positive-displacement pump), in accordance with an embodiment.

Figure 4B:
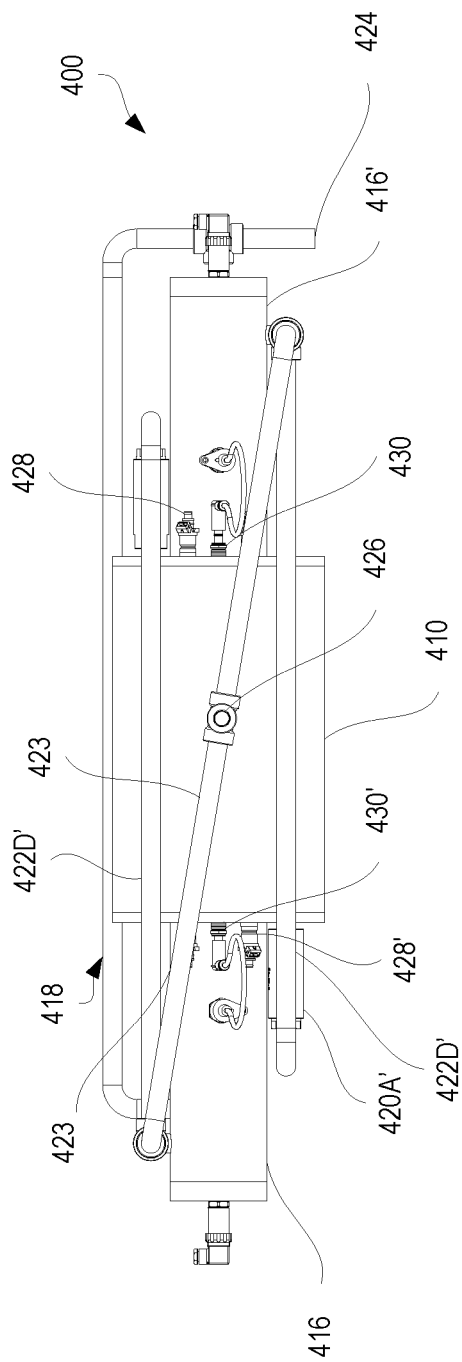
FIG. 4B is a side elevation view of the gas generator of FIG. 4A.
Figure 4C:
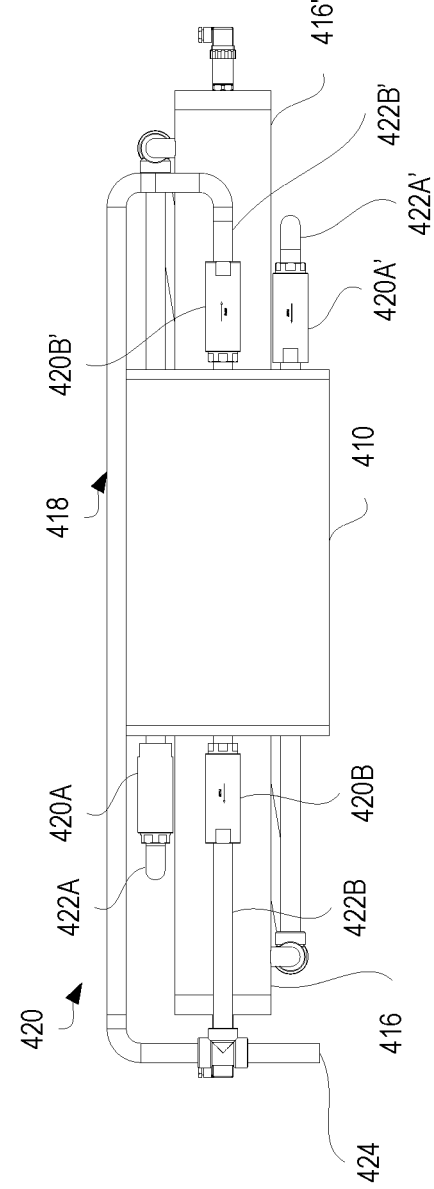
FIG. 4C is another side elevation of the gas generator of FIG. 4A.

FIG. 4B is a side elevation view of the gas generator 400.
FIG. 4C is another side elevation of the gas generator 400.

The gas generator 400 may have a central housing 410 defining a longitudinal direction 412. The longitudinal direction 412 may be oriented between opposed ends 414, 414' of the central housing 410. The gas generator 400 may be powered by internal combustion in the central housing 410.

The gas generator 400 may have arms 416, 416' extending outwardly, along the longitudinal direction 412, from the opposed ends 414, 414' of the central housing 410.

The central housing 410 may define a chamber that is mechanically coupled to receptacles defined by the arms 416, 416' via a piston assembly. The piston assembly may be disposed in the chamber to define two combustions chambers, corresponding to the two opposed ends 414, 414', longitudinally separated by a central member of the piston assembly. Pistons of the piston assembly may be slidably engaged with the receptacles to define fluid chambers in the receptacles that are separated from the combustion chambers. The piston assembly may include a free piston defining two pistons on opposed ends that at least partially form the fluid chambers.

A system 418 of fluid connections may supply working fluid to and from the gas generator 400, and may provide fluid interconnections between various parts of the gas generator 400, including the combustion chambers and the fluid chambers. One or more valves 420 may control directionality of flow in conduits of the system 418.

Flow to and from one of the combustion chambers (in the chamber defined by the central housing 410) may be supplied via the opposed end 414, 414' corresponding to that combustion chamber. Conduits 422A, 422A' may connect to inlets formed in the respective opposed ends 414, 414'. Conduits 422B, 422B' may connect to outlets formed in the respective opposed ends 414, 414'. The conduits 422A, 422A' may supply working fluid to, while the conduits 422B, 422B' may draw away working fluid from, the respective combustion chambers defined by the opposed ends 414, 414'.

Flow from the combustion chambers may exit the pump at an outlet 424. Pressurized and/or hot combustion gases, as well as vaporized and energized working fluid, may exit in mixed form out of the outlet 424, for subsequent heating and/or expansion. The outlet 424 may be a common outlet receiving gases from both sides of the central housing 410.

One-way valves 420A, 420A' may prevent flow reversal in the respective conduits 422A, 422A' by hindering or choking outbound flow in conduits 422A, 422A' from the central housing 410. Similarly, one-way valves 420B, 420B' may prevent flow reversal in the respective conduits 422B, 422B' by hindering or choking inbound flow in conduits 422B, 422B' into the central housing 410.

Flow to and from the fluid chambers in the respective receptacles defined by the corresponding arms 416, 416' may be supplied via respective conduits 422C, 422C'. The conduits 422C, 422C' may extend from opposite ends of a common conduit 423, which may extend diagonally in a generally longitudinal direction.

Working fluid, e.g. liquid $CO_2$, may be supplied to the fluid chambers via the conduits 422C, 422C' from an inlet 426 of the common conduit 423. The working fluid may be supplied from the fluid chambers via the respective conduits 422A, 422A'.

Flow from a fluid chamber may be supplied to a combustion chamber to one of the opposed ends 414, 414' of the gas generator 400. The one of the opposed ends 414, 414' may be opposite to that combustion chamber. Flow into the combustion chambers corresponding to the opposed ends 414, 414' may be supplied from the respective fluid chambers corresponding to the (opposite) arms 416', 416 via respective conduits 422A, 422A'. In this way, both sides of the gas generator 400 may interact with one another.

In various embodiments, one-way valves may be spring-loaded valves. For example, such valves may be passive have simplified construction and provide cost savings compared to actively controlled valves.

Fuel and oxidizer may be supplied to the combustion chambers corresponding to the opposed ends 414, 414' by respective injectors 428, 428'. In some embodiments, the fuel and oxidizer may be injected separately. In some embodiments, the fuel and/or oxidizer may be sprayed and/or atomized upon injection.

Combustion in the combustion chambers corresponding to the opposed ends 414, 414' may be initiated by igniters or spark plugs 430, 430'. For example, the spark plugs 430, 430' may be able to be plugged into an electrical socket for generating a spark for initiating combustion.

Initiation of combustion, and injection of fuel and oxidizer, may be timed using sensors 432, 432' configured to measure movement of a piston assembly housed in the central housing 410. For example, sensors 432, 432' may be magnetic sensors.

Figure 5A:
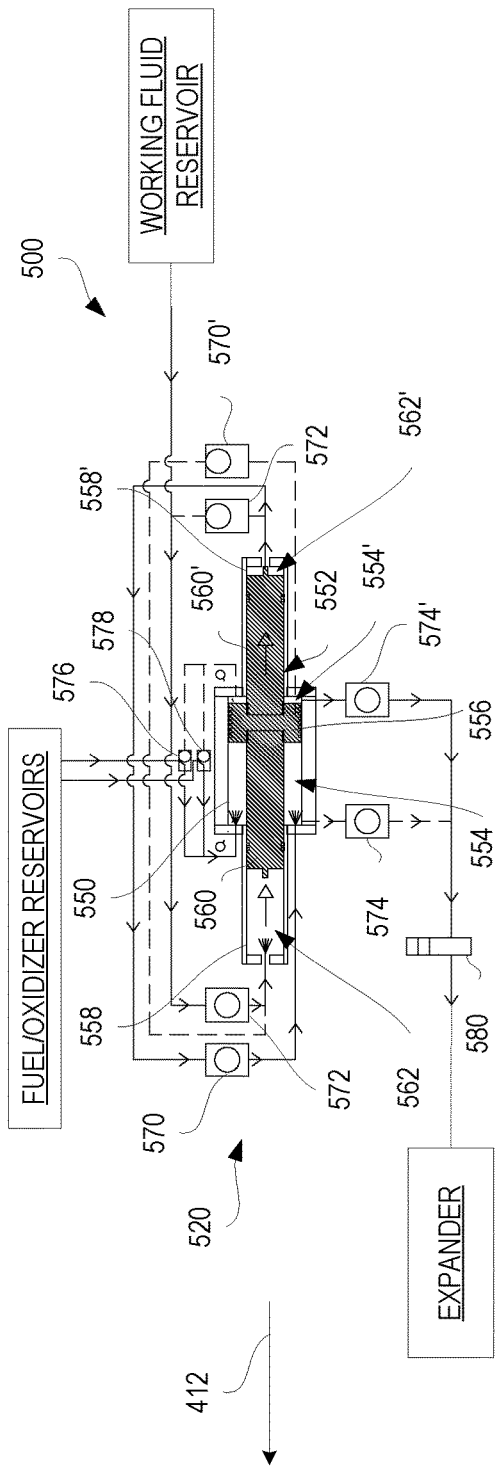
FIG. 5A is a schematic cross-sectional view of a gas generator in a stage of operation, in accordance with an embodiment.

FIG. 5A is a schematic cross-sectional view of a gas generator 500 (or positive-displacement pump) in a stage of operation, in accordance with an embodiment.

Figure 5B:
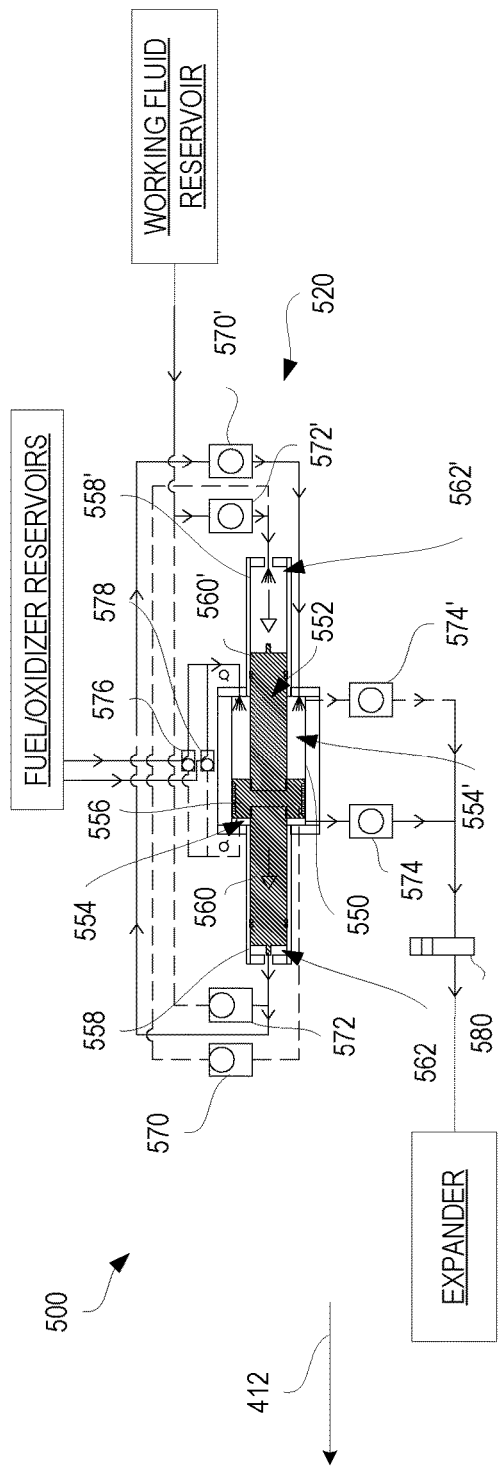
FIG. 5B is a schematic cross-sectional view of the gas generator of FIG. 5A in another stage of operation.

FIG. 5B is a schematic cross-sectional view of the gas generator 500 in another stage of operation.

In some aspects, the gas generator 500 may be similar to the gas generator 400. The gas generator 500 may have a system 518 of fluid connections slightly different than the system 418 of the gas generator 400. Solid lines with arrows connecting parts of the gas generator 500 represent material flows in the particular stage of operation, while dashed lines with arrow represent potential material flows, e.g. in other stages of operation of the gas generator 500.

The gas generator 500 has a chamber 550. A piston assembly 552 is disposed inside the chamber 550 to form two separate spaces in the chamber 550. The two separate spaces may define a first combustion chamber 554 and a second combustion chamber 554'. A member 556 of the piston assembly 552 may seal off or fluidly separate the first combustion chamber 554 from the second combustion chamber 554'. The direction of movement of the piston assembly 552 is indicated with hollow-headed arrows.

The gas generator 500 may define a first receptacle 558 connected to the chamber 550 and a second receptacle 558' connected to the chamber 550 opposite the first receptacle 558.

The piston assembly 552 may define a first piston 560 and a second piston 560' for slidable engagement with, respectively, the second receptacle 558' and the first receptacle 558. Slidable engagement of the piston assembly 552 may facilitate reciprocating motion of the piston assembly 552 inside the chamber 550. The reciprocating motion may be substantially in the longitudinal direction 412.

A first fluid chamber 562 may be formed in the first receptacle 558 and the second fluid chamber 562' may be formed in the second receptacle 558'. The piston assembly 552 may seal off or fluidly separate the first combustion chamber 554 from the first fluid chamber 562, and the second combustion chamber 554' from the second fluid chamber 562. The first piston 560 may be disposed in the first fluid chamber 562 and the first combustion chamber 554 for reciprocating motion between the first fluid chamber 562 and the first combustion chamber 554. Similarly, the second piston 560' may be disposed in the second fluid chamber 562' and the second combustion chamber 554' for reciprocating motion between the second fluid chamber 562' and the second combustion chamber 554'.

The first piston 560 and second piston 560' may be actuatable by combustion in, respectively, the second combustion chamber 554' and the first combustion chamber 554. Actuation may displace the working fluid out of the corresponding fluid chamber.

For example, the first piston 560 may be drivably coupled to the second piston 560' out-of-phase therewith (e.g. 180° phase difference). This may facilitate displacement of the working fluid out of the first fluid chamber 562 into the second combustion chamber 554''.

The gas generator 500 may have one or more valves 520 configured to allow drawing in fuel and oxidizer into the first combustion chamber 554 and the second combustion chamber 554'. Additionally, the one or more valves 520 may be configured to draw in working fluid from the first fluid chamber 562 into the second combustion chamber 554' and from the second fluid chamber 562' into the first combustion chamber 554, while hinder reverse flow towards the first fluid chamber 562 and the second fluid chamber 562'. The one or more valves 520 (in particular, one-way valve 574 and one-way valve 574') may be configured to allow one-way flow of exhaust pressurized gas out of the first combustion chamber 554 and the second combustion chamber 554'.

In reference to FIG. 5A, the second piston 560' is shown actuated and displacing working fluid (e.g. liquid $CO_2$) out of the second fluid chamber 562' into the first combustion chamber 554 and expelling fluids in the second combustion chamber 554' out towards an expander. One-way valve 570 may permit the flow to the first combustion chamber 554 and one-way valve 574' may permit flow towards the expander.

Fuel, such as methane, propane, or other hydrocarbon fuel, and oxidizer, such as oxygen, may be injected into the first combustion chamber 554 and ignited therein.

The working fluid may enter the first combustion chamber 554 simultaneously with combustion therein or shortly thereafter. The higher temperatures therein may flash or vaporize the working fluid, greatly increasing its volume, further actuating the second piston 560'.

In some embodiments, combustion may be between a hydrocarbon fuel and pure oxygen. In various embodiments, the fuel and oxidizer may be substantially free of oxidizable species other than the hydrocarbon fuel. As a result, only oxidized compounds of carbon and hydrogen may be generated, e.g. $CO$, $CO_2$, and $H_2O$. Advantageously, none or substantially reduced NOx compounds are formed relative to combustion in an open system.

In various embodiments, operating temperatures in the first combustion chamber 554 may be under 350° F., between 350° F., and 500° F., or between 200° F., and 1000° F. Even higher operating temperatures may be achieved.

Actuation of the second piston 560' may increase the volume of the first fluid chamber 562. The pressure in the first fluid chamber 562 may drop. Fresh working fluids may be drawn into the first fluid chamber 562. One-way valve 572 may permit flow of working fluid from working fluid reservoir.

In some embodiments, the working fluid displaced out of the second fluid chamber 562' and drawn into first fluid chamber 562 may be liquid $CO_2$. In some cases, the working fluid may include a gas phase, e.g. gas bubbles, or a supercritical fluid phase. In various embodiments, the liquid $CO_2$ may be at an approximate temperature of 70° F., and a pressure of approximately 850 pounds per square in gauge (psig). In various embodiments, it is conceived that variations in thermodynamic properties of the working fluid may occur during the hydraulic process prior to exposure to hot combustion gases, e.g. increase in pressure and temperature with drop in volume. For example, the temperature and pressure mentioned above may be an average temperature.

Movement of the first piston 560 and the second piston 560' may be detected using sensors. Full actuation of the first piston 560 and the second piston 560' may be detected. For example, full actuation of the first piston 560 may be achieved when the member 556 is abutting a wall of the gas generator 500, thereby preventing further movement of the first piston 560.

At full actuation, ignition and flow of fuel and oxidizer to the first combustion chamber 554 may be substantially reduced or stopped. The resulting hot, pressurized fluids in the first combustion chamber 554 may be expelled out. One-way valve 574 may permit such expulsion towards an expander and one-way valve 570 may prevent expulsion back to the second fluid chamber 562'. Fluid pressure in the first combustion chamber 554 may be reduced after expulsion fluids therein.

In some embodiments, the expelled fluids from the first combustion chamber 554 may be composed substantially of oxides of carbon and hydrogen. In some embodiments, temperature of the expelled fluids may be approximately 300° F., and pressure may be 1500 psig (at expulsion). In various embodiments, it is conceived that variations in thermodynamic properties of these fluids may occur during the hydraulic process during and after expulsion, and prior to expansion in the expander.

After stoppage of ignition and flow of fuel and oxidizer to the first combustion chamber 554, fuel and oxidizer may be supplied to the second combustion chamber 554'.

As shown in FIG. 5B, upon ignition of this fuel and oxidizer, the first piston 560 is actuated, pushing working fluid in the first fluid chamber 562 out and into the second combustion chamber 554' via one-way valve 570', which stops reverse flow, pushing fluids out of the first combustion chamber 554 out via one-way valve 574, and drawing working fluid into the second fluid chamber 562' via one-way valve 572'. As described above, the liquid working fluid may then be flashed in the second combustion chamber 554', which further actuates the first piston 560. This occurs until the first piston 560 is fully actuated. Combustion in the second combustion chamber 554' is stopped and fluids are expelled therefrom via one-way valve 574'. With the second fluid chamber 562' charged with fresh working fluid, the process is then repeated.

In various embodiments, a one-valve 576 may prevent backflow of fuel, and a one-way valve 578 may prevent backflow of oxidizer. In some embodiments, fuel and oxidizer is injected pre-mixed—only one one-way valve may be needed to prevent backflow.

In some embodiments, a pulse smoothing device 580 may receive fluids exhausted from the first combustion chamber 554 and the second combustion chamber 554'. For example, the pulse smoothing device 580 may be an accumulator. The pulse smoothing device 580 may convert the intermittent or periodic pumping of fluid, due to the reciprocating action of the piston assembly 552, into substantially continuous pumping.

In some embodiments, a boundary-layer turbine may extract 30-40% of the heat input into the system.

Figure 6:
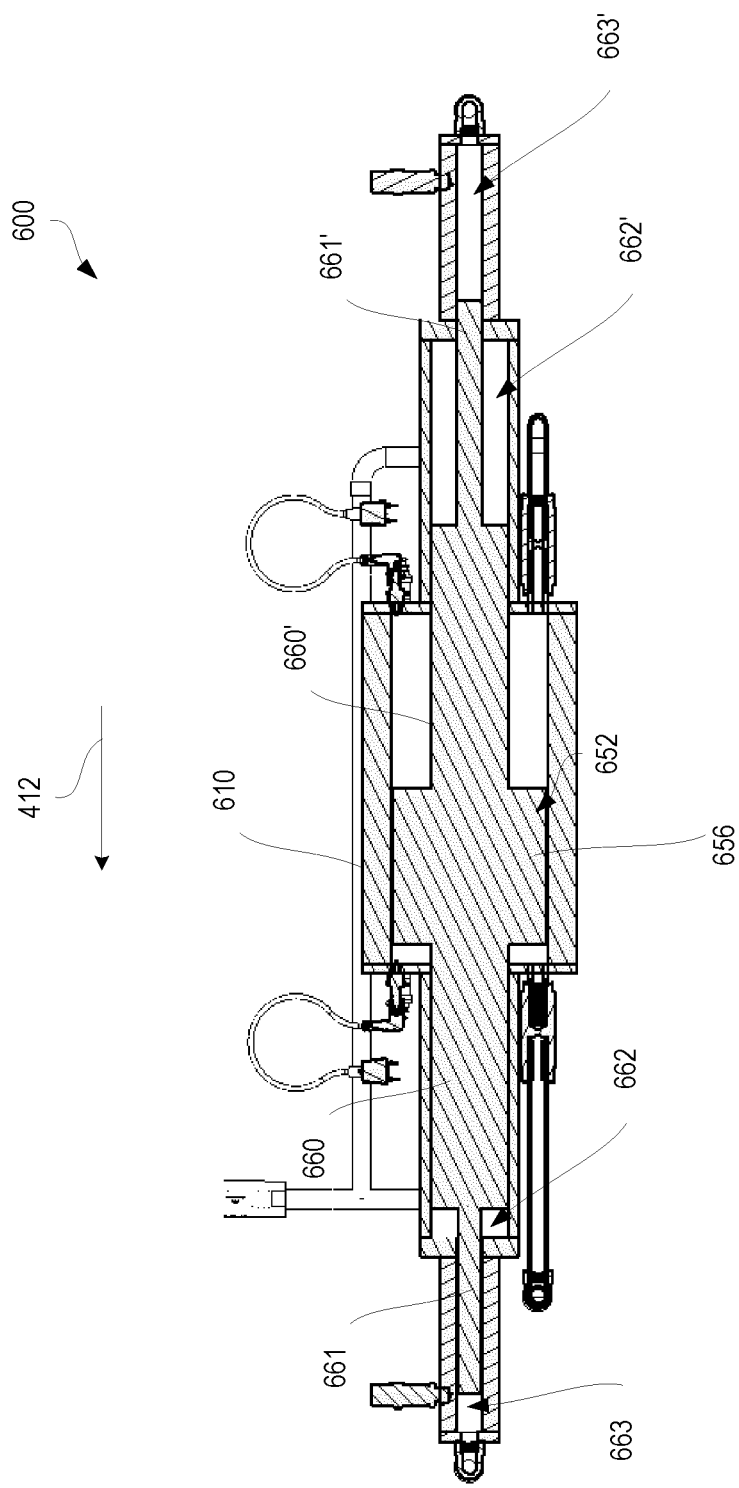
FIG. 6 is a cross-sectional view of a gas generator, in accordance with an embodiment.

FIG. 6 is a cross-sectional view of a gas generator 600, in accordance with an embodiment.

In some aspects, the gas generator 600 may be similar to the gas generator 500.

The gas generator 600 may have a piston assembly 652, with a member 656 disposed in a central housing 610. Arms may extend laterally from the central housing 610.

Rather than two arms as in gas generator 500, the gas generator 600 may have four arms; two opposed groups of two arms arranged serially and extending outwardly from the gas generator 600 along the longitudinal direction 412.

The arms may define fluid chambers 662, 662' extending from opposite sides of the central housing 610. Pistons 660, 660' extending from the member 656 are slidably engaged with the fluid chambers 662, 662'. Additional fluid chambers 663, 663' may extend further outwardly from the fluid chambers 662, 662', in the longitudinal direction 412. Pistons 661, 661' extending from the respective pistons 660, 660' are slidably engaged with the corresponding fluid chambers 663, 663'.

The pistons 661, 661' may be rigidly coupled to the pistons 660, 660' so that actuating the piston 660 also actuates the piston 661. The fluid chambers 663, 663' may be supplied a hydrocarbon fuel and/or an oxidizer. Actuation of the pistons 661, 661' may pump the fluid in the respective fluid chambers 663, 663' out thereof. For example, actuation of the pistons 661, 661' may be used to pump hydrocarbon fuel and/or an oxidizer into combustion chambers of the gas generator 600. Such a configuration may reduce or eliminate a need for external pumping of fuel and/or oxidizer. In some embodiments, additional fluid chambers and corresponding pistons may be provided.

For example, in some embodiments, separate fluid chambers—along with actuatable pistons—may be provided for each of the hydrocarbon fuel and the oxidizer (each combustion chamber of the gas generator 600 having a separate hydrocarbon/oxidizer pump). In various embodiments, the size of the fluid chambers may be varied to vary an oxidizer/fuel mixture.

Figure 7A:
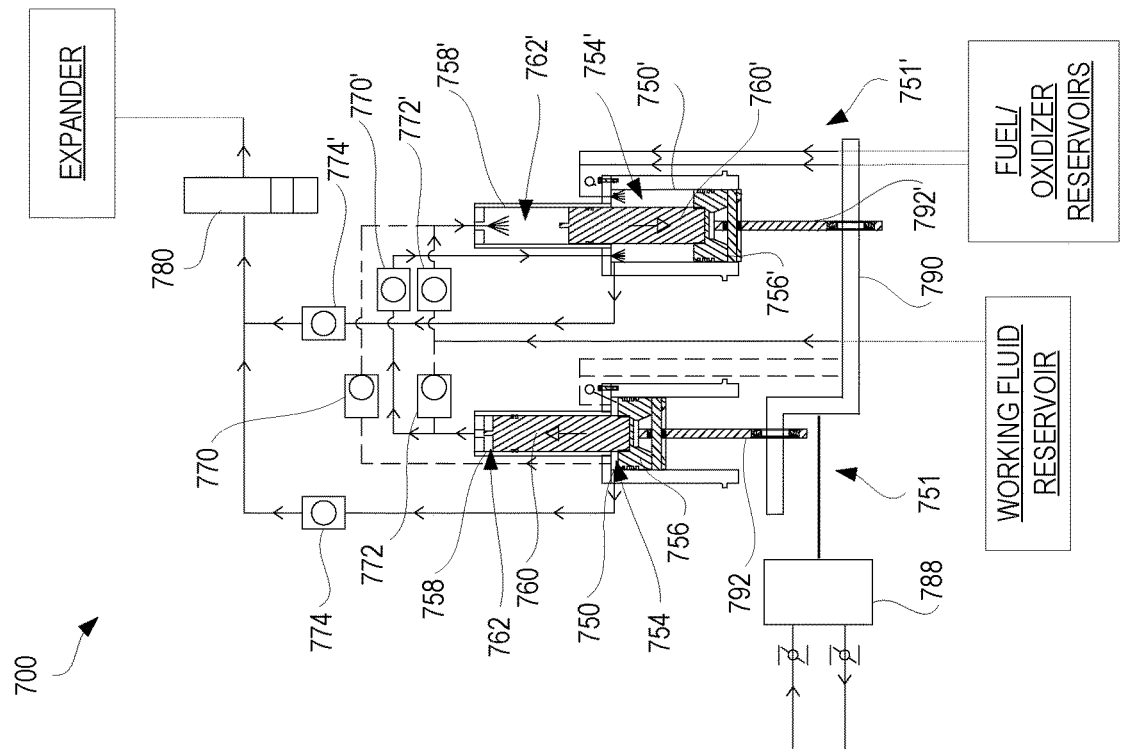
FIG. 7A is a schematic cross-sectional view of a gas generator in a stage of operation, in accordance with an embodiment.

FIG. 7A is a schematic cross-sectional view of a gas generator 700 in a stage of operation, in accordance with an embodiment.

Figure 7B:
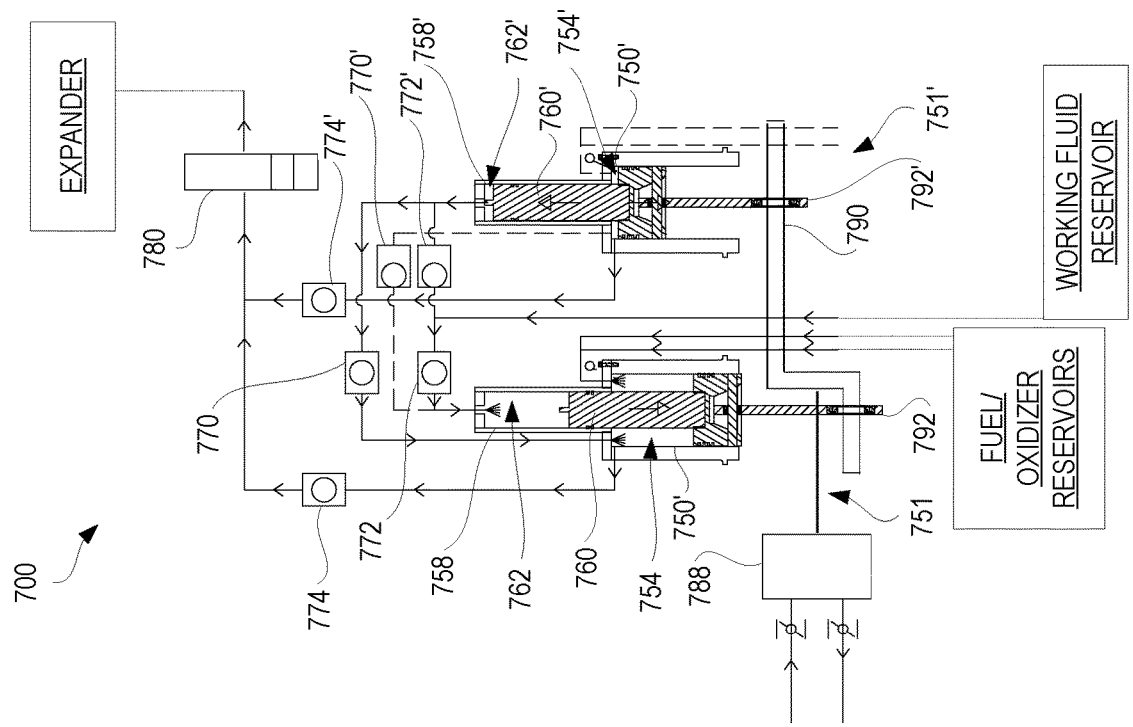
FIG. 7B is a schematic cross-sectional view of the gas generator of FIG. 7A, in another stage of operation.

FIG. 7B is a schematic cross-sectional view of the positive-displacement gas generator 700 in another stage of operation.

In some aspects, the gas generator 700 may be similar in construction and operation to the gas generator 500. Reference numerals in FIGS. 7A-7B of parts analogous to parts in FIGS. 5A-5B carry the same last two digits as the corresponding analogous parts in FIGS. 5A-5B, with the first digit (5) replaced with 7. It is understood that, where applicable, the description of operation of the gas generator 500 may be transposed onto gas generator 700. In this context, FIG. 7A corresponds to FIG. 5A, and FIG. 7B corresponds to FIG. 5B.

Solid lines with arrows connecting parts of the gas generator 700 represent material flows in the particular stage of operation, while dashed lines with arrow represent potential material flows, e.g. in other stages of operation of the gas generator 700.

The gas generator 700 may have a first piston cylinder 751 and a second piston cylinder 751' for housing, respectively, a first piston 760 and a second piston 760' for reciprocating motion of the pistons therein. As referred to herein, "cylinder" is not intended to limit pistons to strictly cylindrical shapes (having circular cross-sections). For example, cylinder may be analogous to cylinders of internal combustion engines.

The gas generator 700 may have a first combustion chamber 754 and a first fluid chamber 762 formed on opposed sides of the first piston 760 inside the first piston cylinder 751. Similarly, the gas generator 700 may also have a second combustion chamber 754' and the second fluid chamber 762' formed on opposed sides of the second piston 760' inside the second piston cylinder 751'.

The first combustion chamber 754 and the second combustion chamber 754' may be defined in, respectively, a first chamber 750 of the piston cylinder 751 and a second chamber 750' of the piston cylinder 751'. The first fluid chamber 762 and the second fluid chamber 762' may be defined in, respectively, a first receptacle 758 of the piston cylinder 751 and a second receptacle 758' of the piston cylinder 751'.

Working fluid, e.g. liquid $CO_2$, may be supplied to the first fluid chamber 762 and the second fluid chamber 762' via respective one-way valves 772, 772'. Hot pressurized, including vaporized working fluid, may be exhausted out of the first combustion chamber 754 and the second combustion chamber 754' via respective one-way valves 774, 774'. A pulse smoothing device 780, e.g. an accumulator, may be used to reduce pulsation in the volumetric flow rate (pulsatile flow) associated with intermittent or periodic pumping.

The first fluid chamber 762 may be fluidly connected to the second combustion chamber 754' via one-way valve 770', and the second fluid chamber 762' may be fluidly connected to the first combustion chamber 754 via the one-way valve 770.

The one-way valve 770' and the one-way valve 770 may be configured to, respectively, allow working fluid from the first fluid chamber 762 into the second combustion chamber 754' and working fluid from the second fluid chamber 762' into the first combustion chamber 754. The one-way valve 770' and the one-way valve 770 may be configured to, respectively, hinder flow from the second combustion chamber 754' to the first fluid chamber 762 and flow from the first combustion chamber 754 to the second fluid chamber 762'.

A crankshaft 790 may be connected to the first piston 760 and the second piston 760'. The crankshaft 790 may define a 180° phase difference between a crank throw, defined by a connecting rod 792 of the first cylinder 751, of the first piston 760 and a crank throw, defined by a connecting rod 792' of the second cylinder 751', of the second piston 760'.

The crankshaft 790 may be drivably coupled to the first piston 760 and the second piston 760' to displace working fluid from the first fluid chamber 762 into the second combustion chamber 754' and from the second fluid chamber 762' into the first combustion chamber 754, in an alternating manner.

The crankshaft 790 may be coupled to a crankshaft power regulating device 788. During operation of the gas generator 700, power may not be extracted from the crankshaft 790 so as to avoid reducing the power extracted in a downstream expander. In various embodiments, frictional forces and the non-negligible mass of the crankshaft itself may reduce the power extracted in the downstream expander.

In some embodiments, the crankshaft 790 may be used to power pumps for fuel and oxidizer injection via the crankshaft power regulating device 788. In some embodiments, the crankshaft 790 may be used for other accessories, e.g. on an as-needed basis.

In some embodiments, power may be supplied to the crankshaft 790 via the crankshaft power regulating device 788. For example, power may be supplied to crankshaft 790 to increase a pumping rate of the gas generator 700.

The pistons in the gas generator 500 may reciprocate along the longitudinal direction in series as they may be rigidly coupled via the member 556, which may reciprocate inside the unitary chamber 550.

In comparison, the pistons in the gas generator 700 may not be rigidly coupled, as there is no central member like the member 556. However, the pistons may instead be coupled via a coupling assembly comprising the connecting rods 792, 792' coupled to the (common) crankshaft 790. Such a coupling assembly may be understood to substantially replace the member 556. Accordingly, the gas generator 700 does not have a unitary chamber such as chamber 550 but rather two separate chambers 750, 750' (a broken central chamber) that couple with opposed ends of the coupling assembly. The crankshaft 790 may be configured to maintain an out-of-phase relationship between the pistons similar to the out-of-phase relationship between the pistons in the gas generator 500.

In some embodiments, such a non-rigid coupling between pistons may facilitate faster pumping and operation of the pistons. For example, in various embodiments, the pistons may cycle more than 500 times per minute, or more than 2000 times per minute. In various embodiments, deleterious vibrations and resonances may be reduced relative to the gas generator 500.

In various embodiments, sensors may be used to initiate and control combustion in the combustion chambers of the gas generator 700. Supply of fuel and oxidizer, as well as operation of spark plugs, may be based on sensor measurements. For example, ignition may be digitally timed.

In some embodiments, the gas generator 700 may advantageously be operated without the use of sensors. For example, the gas generator 700 may be operated using mechanically timed ignition. In some embodiments, a distributor may contain a rotating cam driven by the crankshaft 790.

In some embodiments, ignition may be achieved autonomously, e.g. by compression.

Figure 8:
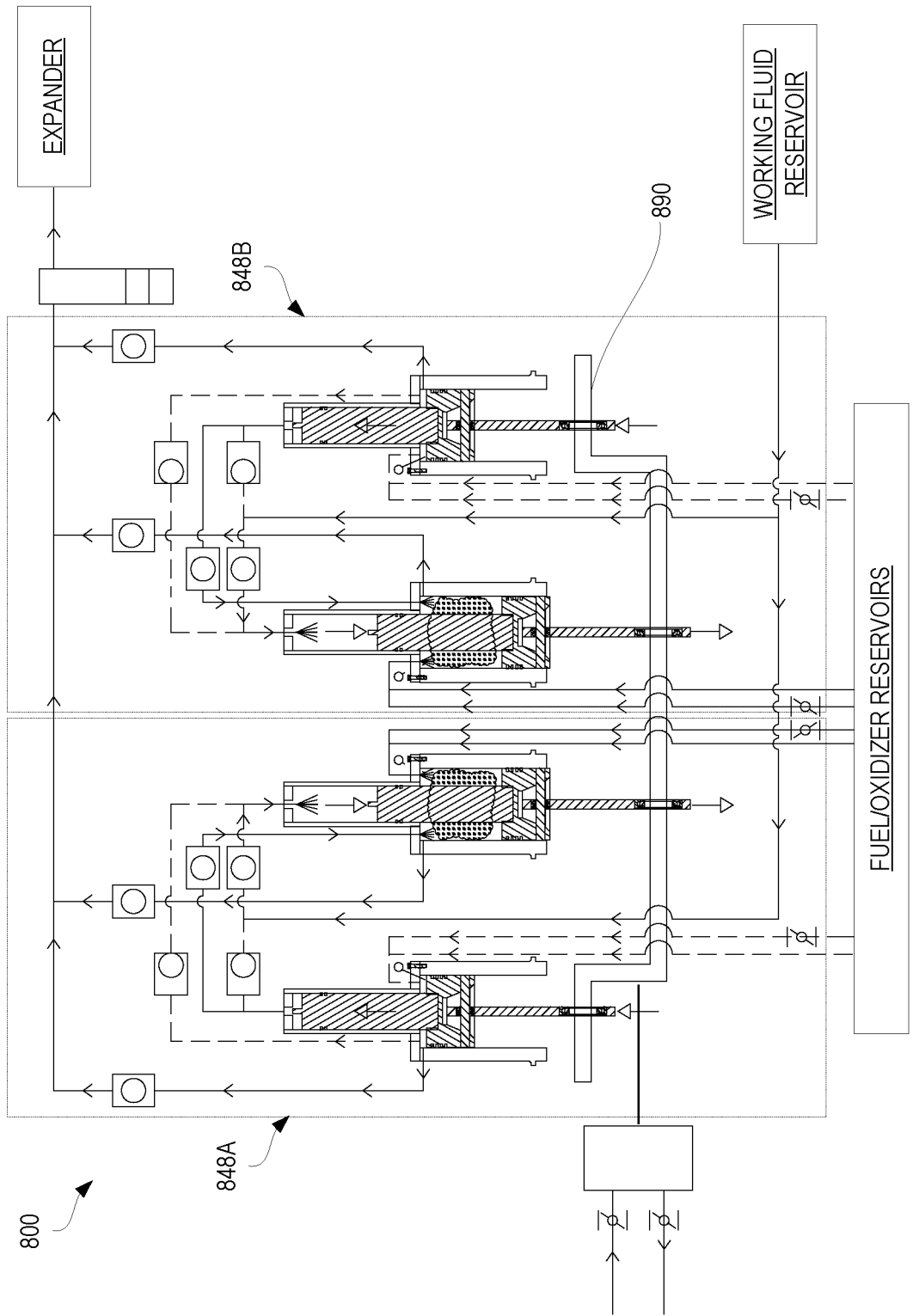
FIG. 8 is a schematic cross-sectional view of a gas generator, in accordance with an embodiment.

FIG. 8 is a schematic cross-sectional view of a gas generator 800, in accordance with an embodiment.

Solid lines with arrows connecting parts of the gas generator 800 represent material flows in the particular stage of operation, while dashed lines with arrow represent potential material flows, e.g. in other stages of operation of the gas generator 800.

The gas generator 800 may comprise two pairs of cylinders 848A, 848B. Each pair may be configured similar to the pair of cylinders of the gas generator 700, e.g. the cylinders may be coupled together via the crankshaft and out-of-phase with one another. The two pairs of cylinders 848A, 848B may be coupled together via a common crankshaft 890.

In some embodiments, additional pairs of cylinders may be added. For example, in various embodiments, the gas generator 800 may have 3 pairs (6 cylinders), 4 pairs (8 cylinders), or 5 pairs (10 cylinders). Increasing the number of pairs may facilitate smoother power output.

In various embodiments, each pair of cylinders may define a gauge angle with respect to the crankshaft, e.g. for a given pair of cylinders, the gauge angle may be the absolute (angular) crank position of one of the pistons of the pair of cylinders or an average of the crank positions of both pistons. The gauge angle may vary from pair to pair, e.g. in a pump having 4 pairs of cylinders, each pair may define a gauge angle that is offset 90° relative to a gauge angle of an adjacent pair.

Figure 9A:
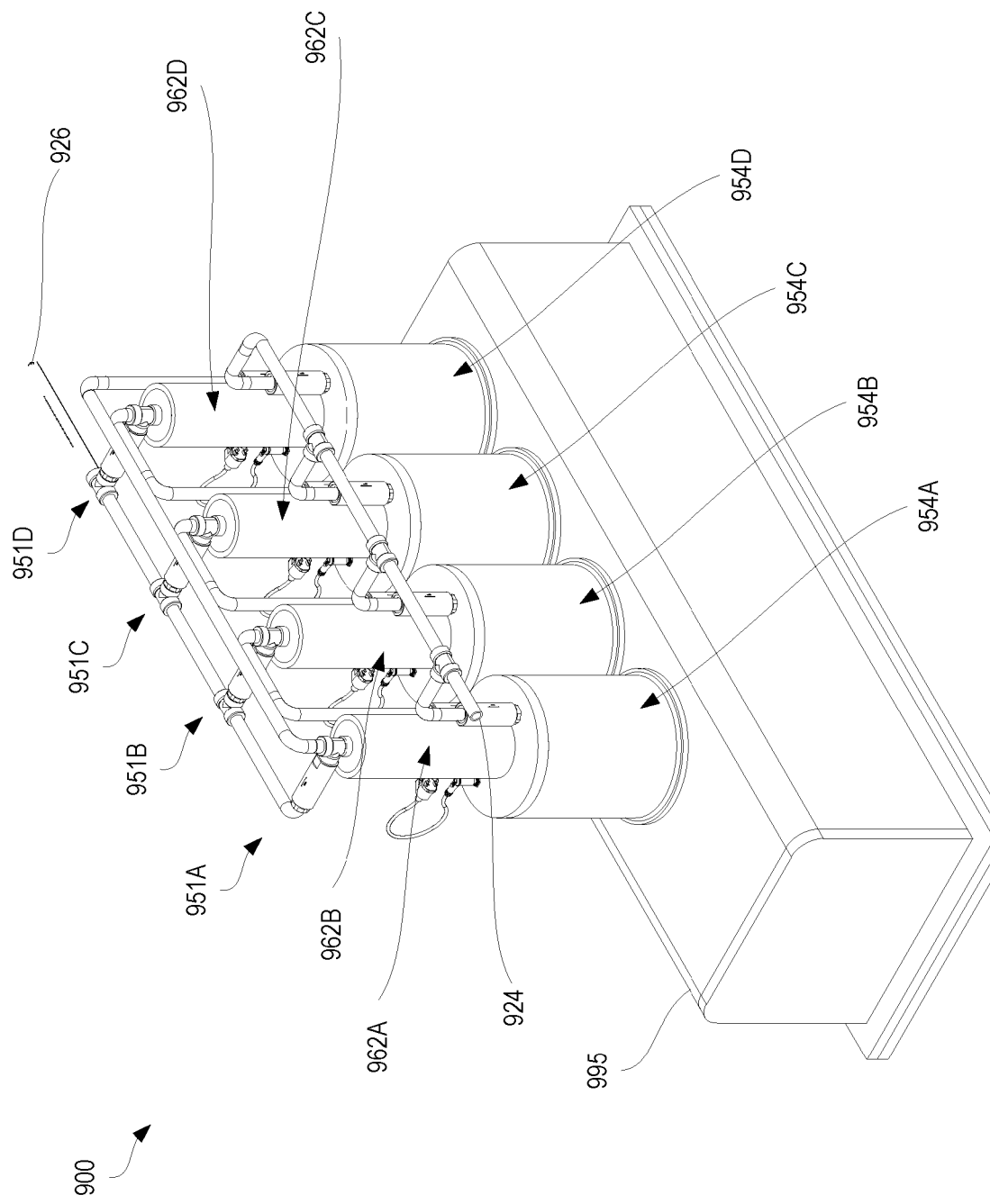
FIG. 9A is a perspective view of a gas generator, in accordance with an embodiment.
Figure 9B:
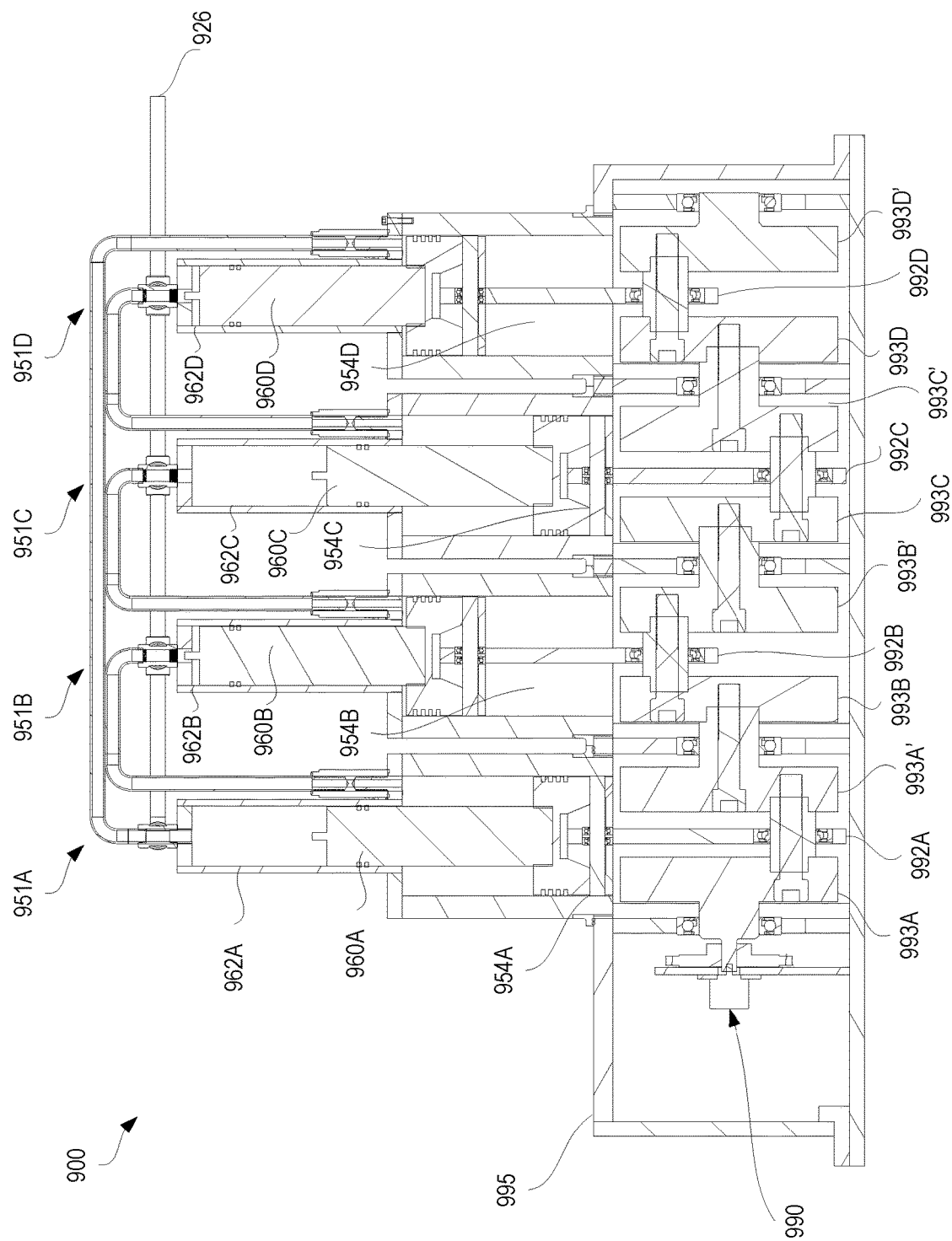
FIG. 9B is a cross-sectional view of the gas generator of FIG. 9A parallel to a crankshaft of the gas generator.

FIG. 9A is a perspective view of a gas generator 900, in accordance with an embodiment;

FIG. 9B is a cross-sectional view of the gas generator 900 parallel to a crankshaft 990 of the gas generator 900.

Figure 9C:
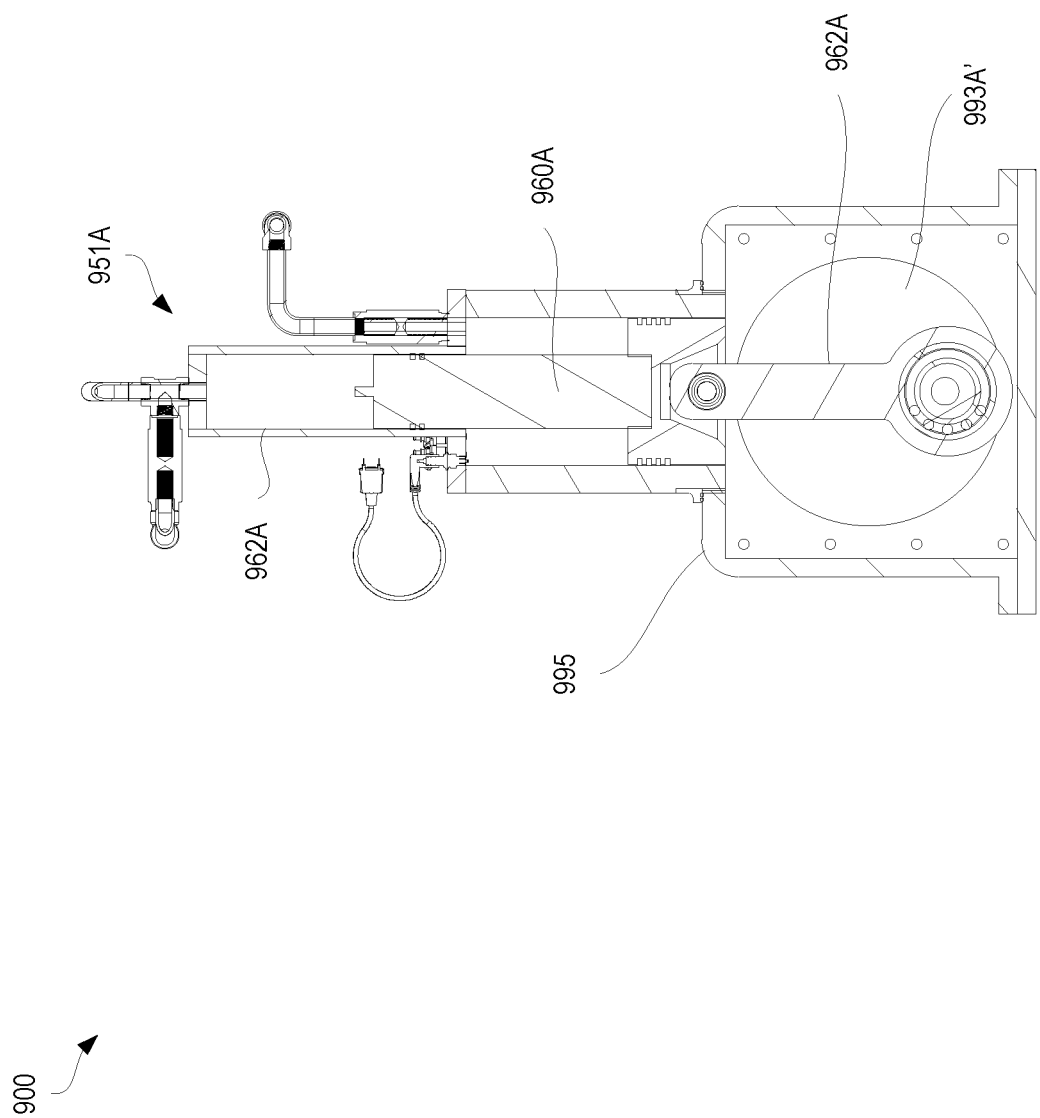
FIG. 9C is a cross-sectional view of the gas generator of FIG. 9A perpendicular to the crankshaft of the gas generator.

FIG. 9C is a cross-sectional view of the gas generator 900 perpendicular to the crankshaft 990 of the gas generator 900, through a cylinder 951A of the gas generator 900.

The gas generator 900 receives working fluid from an inlet 926 and exhausts hot, pressurized gases from outlet 924. The gas generator 900 comprises four cylinders 951A, 951B, 951C, 951D. The cylinders are arranged in series (daisy-chained) so that the fluid chambers 962A, 962B, 962C, 962D of the cylinders 951A, 951B, 951C, 951D are fluidly connected to the respective combustion chambers 954D, 954A, 954B, 954C of the cylinders 951D, 951A, 951B, 951C. As a result, the gas generator 900 comprises cylinders connected in series. While the interconnections between cylinders are asymmetric (a cylinder may be fluidly connected to two other cylinders), each cylinder is fluidly connected to another.

The crankshaft 990 of the gas generator 900 is disposed inside a substantially sealed crankcase 995. The pressure inside the crankcase 995 may be maintained at a pressure of a $CO_2$ reservoir that is used to supply fluid chambers of the gas generator 900. This may reduce leakage. This may also reduce or eliminate a need to provide suction to prevent backflow.

The crankshaft 990 may comprise a plurality of coupling plates, including front coupling plates 993A, 993B, 993C, 993D, and corresponding rear coupling plates 993A', 993B', 993C', 993D'.

Connecting rods 992A, 992B, 992C, 992D, of the respective cylinders 951A, 951B, 951C, 951D, may be coupled to and disposed in-between the respective front coupling plates 993A, 993B, 993C, 993D, and corresponding rear coupling plates 993A', 993B', 993C', 993D'. The coupling may be achieved via bearing-mounted pins, e.g. as seen in FIG. 9C, where a cross-section through the connecting rod 962A shows a roller bearing. Angular offsets of coupling locations on the coupling plates may determine the phase relationship between the various cylinders.

In gas generator 900, pistons 960A, 960B, 960C, 960D of the cylinders 951A, 951B, 951C, 951D may have phase relationships at least partially defined by the interconnections between the cylinders. In gas generator 900, piston 960A may be 180° out-of-phase with piston 960B, piston 960B may be 180° out-of-phase with piston 960C, piston 960C may be 180° out-of-phase with piston 960D, and piston 960D may be 180° out-of-phase with piston 960A.

Figure 10:
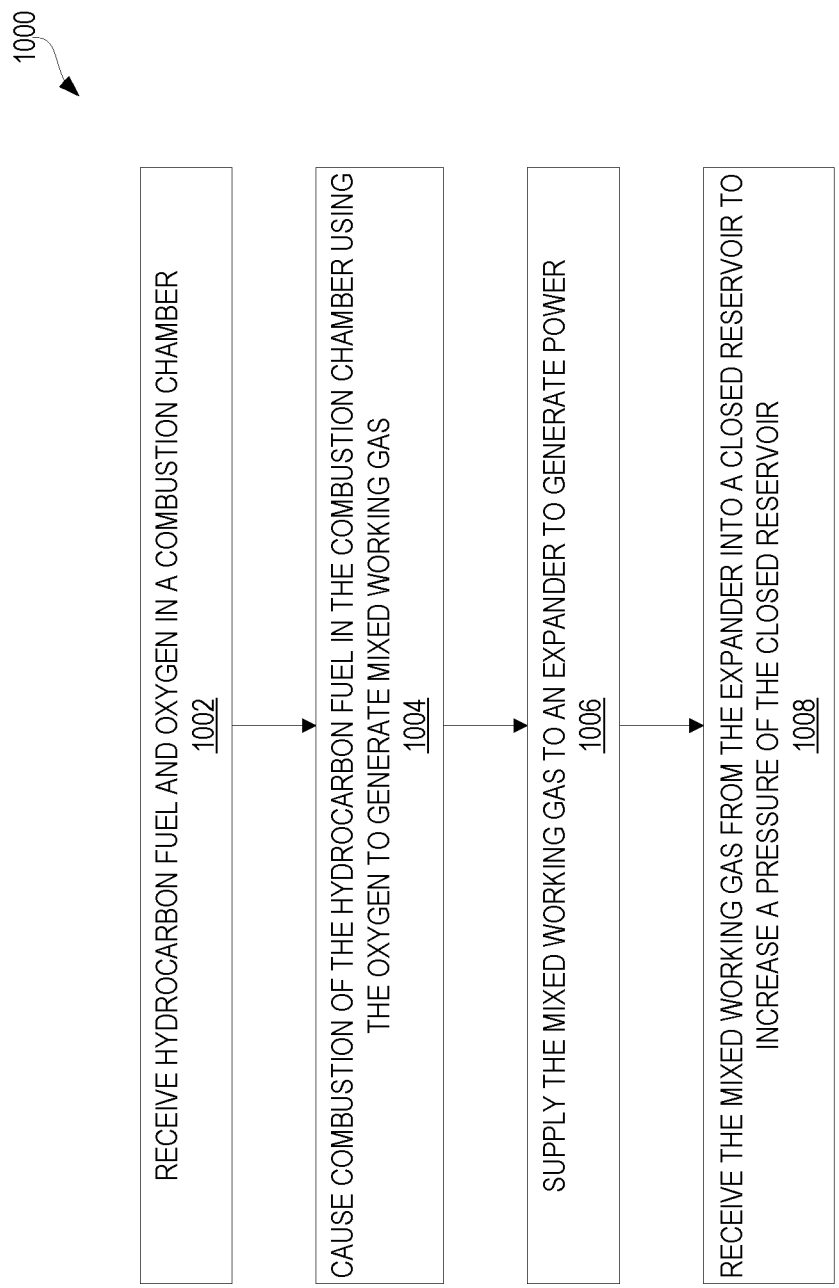
FIG. 10 is flow chart of a method of generating power, in accordance with an embodiment.

FIG. 10 is flow chart of a method 1000 of generating power, in accordance with an embodiment.

Step 1002 of the method 1000 may include receiving hydrocarbon fuel and oxygen in a combustion chamber.

Step 1004 of the method 1000 may include causing combustion of the hydrocarbon fuel in the combustion chamber using the oxygen to generate mixed working gas:

Step 1006 of the method 1000 may include supplying the mixed working gas to an expander to generate power; and Step 1008 of the method 1000 may include receiving the mixed working gas from the expander into a closed reservoir to increase a pressure of the closed reservoir.

Some embodiments of the method 1000 may include receiving liquid $CO_2$ in the combustion chamber from the closed reservoir to mix the hydrocarbon fuel and the oxygen with the liquid $CO_2$ in the combustion chamber, the closed reservoir being pressurized, In some embodiments of the method 1000, causing combustion of the hydrocarbon fuel in the combustion chamber generates combustion gas, the combustion gas vaporizing and mixing with the liquid $CO_2$ to generate the mixed working gas.

Some embodiments of the method 1000 may include supplying fluids from the closed reservoir to a second expander to reduce pressure in the closed reservoir and to generate power.

Some embodiments of the method 1000 may include using the power generated by the second expander to pressurize at least one of the hydrocarbon fuel and the oxygen upstream of the combustion chamber.

Some embodiments of the method 1000 may include using the power generated by the second expander to drive a pump to draw the hydrocarbon fuel from a fuel reservoir into the combustion chamber.

Some embodiments of the method 1000 may include drawing the oxygen from an oxidizer reservoir into the combustion chamber, the oxidizer reservoir being pressurized relative to the combustion chamber.

Some embodiments of the method 1000 may include mixing combustion gas generated in a booster combustion chamber with the mixed working gas, upstream of the expander.

Some embodiments of the method 1000 may include using heat from the mixed working gas, upstream of the closed reservoir and downstream of the expander, to preheat the mixed working gas upstream of the booster combustion chamber.

Some embodiments of the method 1000 may include using pressure swing adsorption to generate the oxygen from air.

Some embodiments of the method 1000 may include supplying the oxygen to an oxidizer reservoir, the oxidizer reservoir being pressurized relative to the combustion chamber.

Some embodiments of the method 1000 may include drawing the oxygen from the oxidizer reservoir into the combustion chamber.

Some embodiments of the method 1000 may include separating liquid $CO_2$ from gaseous $CO_2$ in the closed reservoir by density stratification.

In some embodiments of the method 1000, the combustion chamber is a first combustion chamber, the mixed working gas is a first portion of mixed working gas, the closed reservoir being pressurized.

Some embodiments of the method 1000 may include receiving hydrocarbon fuel and oxygen in a second combustion chamber.

Some embodiments of the method 1000 may include causing combustion of the hydrocarbon fuel in the second combustion chamber using the oxygen in the second combustion chamber to generate a second portion of mixed working gas.

Some embodiments of the method 1000 may include receiving liquid $CO_2$ in a first fluid chamber from the closed reservoir.

Some embodiments of the method 1000 may include receiving liquid $CO_2$ in a second fluid chamber from the closed reservoir.

Some embodiments of the method 1000 may include actuating a first piston by combustion in the first combustion chamber to push liquid $CO_2$ from the first fluid chamber into the second combustion chamber.

Some embodiments of the method 1000 may include actuating a second piston by combustion in the second combustion chamber to push liquid $CO_2$ from the second fluid chamber into the first combustion chamber.

In some embodiments of the method 1000, causing combustion of the hydrocarbon fuel in the first combustion chamber generates a first portion of combustion gases that vaporizes and mixes with liquid $CO_2$ in the first combustion chamber to generate the first portion of the mixed working gas. In some embodiments of the method 1000, causing combustion of the hydrocarbon fuel in the second combustion chamber generates a second portion of combustion gases that vaporizes and mixes with liquid $CO_2$ in the second combustion chamber to generate the second portion of the mixed working gas.

Figure 11A:
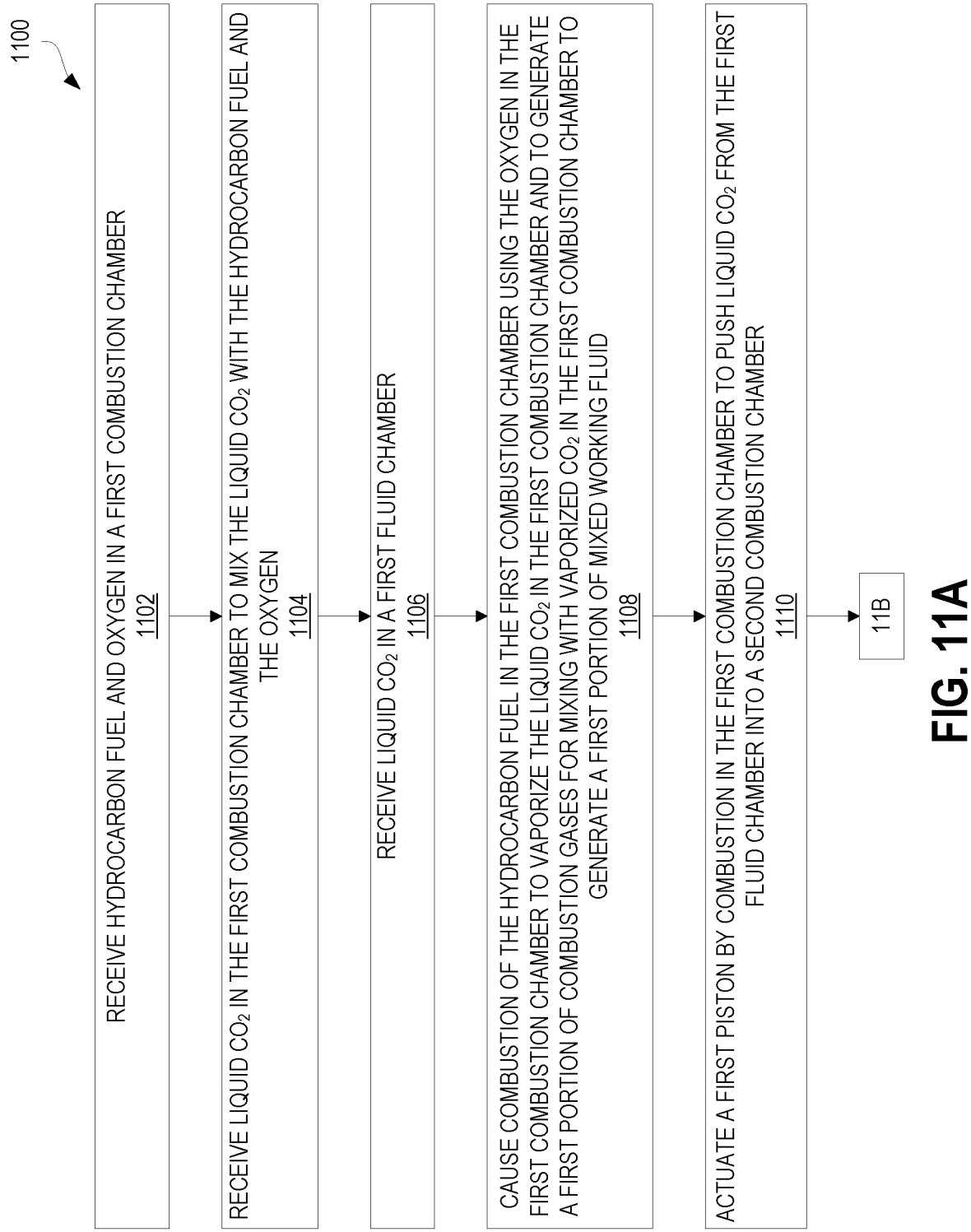
FIG. 11A is a first flow chart of a method of generating gas, in accordance with an embodiment.

FIG. 11A is first flow chart of a method 1100 of generating gas, in accordance with an embodiment.

Figure 11B:
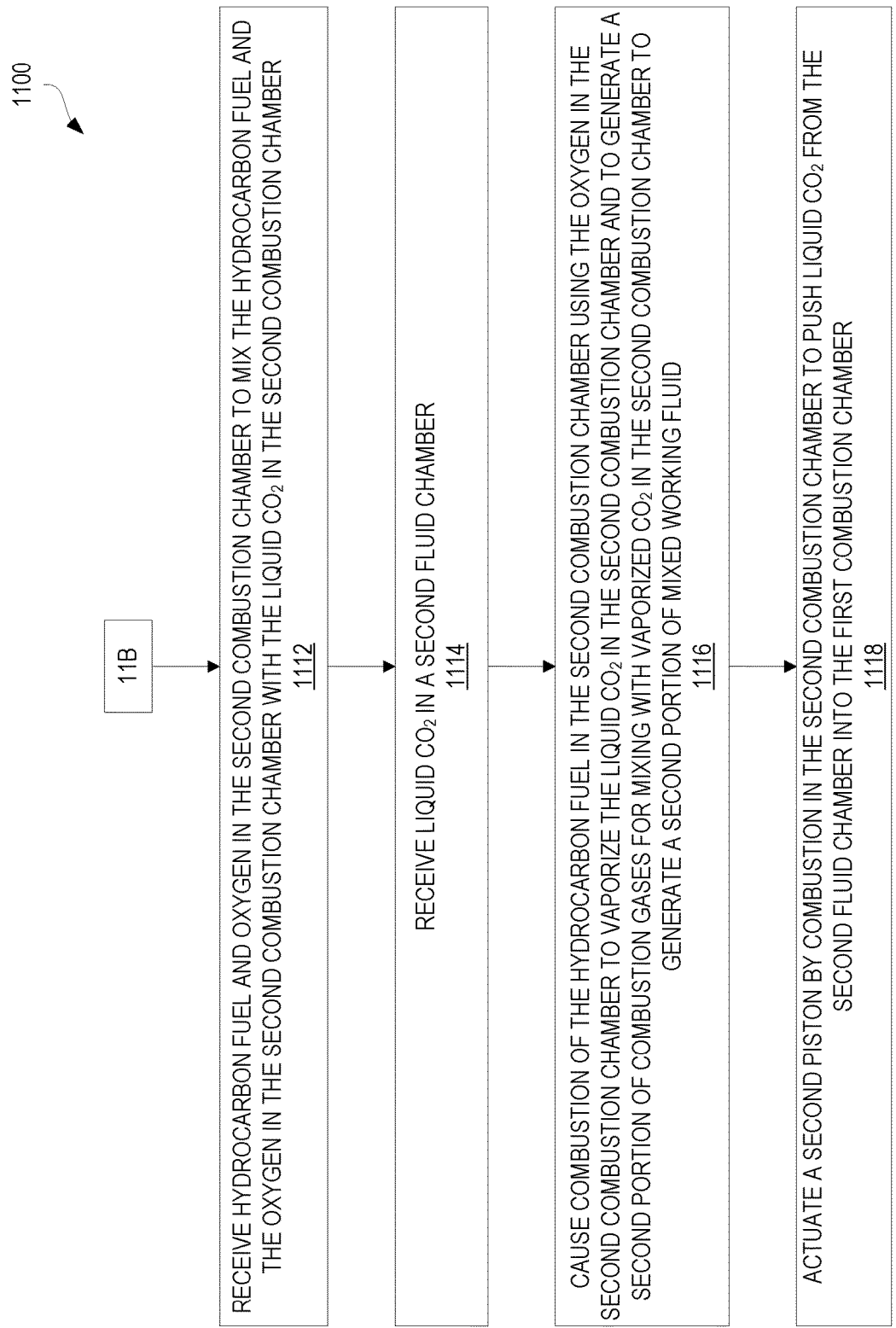
FIG. 11B is a second flow chart of a method of generating gas, in accordance with an embodiment.

FIG. 11B is second flow chart of a method 1100 of generating gas, in accordance with an embodiment.

The steps of the method 1100 in FIG. 11B may follow the steps of the method 1100 in FIG. 11A.

Step 1102 of the method 1100 may include receiving hydrocarbon fuel and oxygen in a first combustion chamber.

Step 1104 of the method 1100 may include receiving liquid $CO_2$ in the first combustion chamber to mix the liquid $CO_2$ with the hydrocarbon fuel and the oxygen.

Step 1106 of the method 1100 may include receiving liquid $CO_2$ in a first fluid chamber.

Step 1108 of the method 1100 may include causing combustion of the hydrocarbon fuel in the first combustion chamber using the oxygen in the first combustion chamber to vaporize the liquid $CO_2$ in the first combustion chamber and to generate a first portion of combustion gases for mixing with vaporized $CO_2$ in the first combustion chamber to generate a first portion of mixed working fluid.

Step 1110 of the method 1100 may include actuating a first piston by combustion in the first combustion chamber to push liquid $CO_2$ from the first fluid chamber into a second combustion chamber.

Step 1112 of the method 1100 may include receiving hydrocarbon fuel and oxygen in the second combustion chamber to mix the hydrocarbon fuel and the oxygen in the second combustion chamber with the liquid $CO_2$ in the second combustion chamber.

Step 1114 of the method 1100 may include receiving liquid $CO_2$ in a second fluid chamber.

Step 1116 of the method 1100 may include causing combustion of the hydrocarbon fuel in the second combustion chamber using the oxygen in the second combustion chamber to vaporize the liquid $CO_2$ in the second combustion chamber and to generate a second portion of combustion gases for mixing with vaporized $CO_2$ in the second combustion chamber to generate a second portion of mixed working fluid.

Step 1118 of the method 1100 may include actuating a second piston by combustion in the second combustion chamber to push liquid $CO_2$ from the second fluid chamber into the first combustion chamber.

In some embodiments of the method 1100, the first piston and the second piston are integrally coupled to each other.

In some embodiments of the method 1100, the first piston and the second piston are coupled to each other by a crankshaft.

As can be understood, the examples described above and illustrated are intended to be exemplary only.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, in some pumps, six cylinders or eight cylinders may be connected in series, additional fluid components may be used between pumps and expanders, and various other arrangements may be used to control and determine timing of the cylinders in pumps. Yet further modifications could be implemented by a person of ordinary skill in the art in view of the present disclosure, which modifications would be within the scope of the present technology.

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

What is claimed is:

1. A gas generator, comprising:
a first fluid chamber connected to a supply of a first fluid to receive a first portion of the first fluid;
a second fluid chamber connected to the supply of the first fluid to receive a second portion of the first fluid;
a first combustion chamber connected to a supply of a second fluid to receive a first portion of the second fluid;
a second combustion chamber connected to the supply of the second fluid to receive a second portion of the second fluid;
a first piston disposed in the first fluid chamber and coupled to the first combustion chamber for reciprocating motion between the first fluid chamber and the first combustion chamber, the first piston being actuatable to expand the first combustion chamber by combustion in the first combustion chamber; and
a second piston disposed in the second fluid chamber and coupled to the second combustion chamber for reciprocating motion between the second fluid chamber and the second combustion chamber, the second piston being actuatable to expand the second combustion chamber by combustion in the second combustion chamber, the second piston mechanically coupled to the first piston for actuation of the first piston by combustion of the second portion of the second fluid in the second combustion chamber to displace the first portion of the first fluid out of the first fluid chamber into the second combustion chamber while expelling gas in the first combustion chamber, and for actuation of the second piston by combustion of the first portion of the second fluid in the first combustion chamber to displace the second portion of the first fluid out of the second fluid chamber into the first combustion chamber while expelling gas in the second combustion chamber.

2. The gas generator of claim 1, wherein the second fluid includes oxygen, the first fluid is liquid in the first fluid chamber and the second fluid chamber, the first fluid being mixed with the second fluid in the first combustion chamber and the second combustion chamber, and the first fluid vaporizes in the first combustion chamber and the second combustion chamber due to combustion of the second fluid without oxidization of the first fluid.

3. The gas generator of claim 2, wherein the first fluid is $CO_2$ and the second fluid includes a hydrocarbon fuel for generating $CO_2$ upon combustion and an oxidizer, the first fluid and second fluid being substantially free of oxidizable species other than the hydrocarbon fuel.

4. The gas generator of claim 1, wherein an operating temperature in the first combustion chamber and the second combustion chamber is less than 1000° F.

5. The gas generator of claim 1, further comprising:
a chamber;
a first receptacle connected to the chamber;
a second receptacle connected to the chamber opposite the first receptacle; and
a piston assembly defining the first piston and the second piston, the piston assembly disposed inside the chamber to form two separate spaces in the chamber and slidably engaged with the first receptacle and the second receptacle for reciprocating motion inside the chamber, the two separate spaces defining the first combustion chamber and the second combustion chamber, the first fluid chamber formed in the first receptacle and fluidly separated from the first combustion chamber by the piston assembly, the second fluid chamber formed in the second receptacle and fluidly separated from the second combustion chamber by the piston assembly.

6. The gas generator of claim 1, wherein the first fluid chamber is fluidly connected to the second combustion chamber, and the second fluid chamber is fluidly connected to the first combustion chamber, the gas generator further comprising:
a first piston cylinder for housing the first piston for reciprocating motion therein, the first combustion chamber and the first fluid chamber formed on opposed sides of the first piston inside the first piston cylinder;
a second piston cylinder for housing the second piston for reciprocating motion therein, the second combustion chamber and the second fluid chamber formed on opposed sides of the second piston inside the second piston cylinder; and
a crankshaft connected to the first piston and the second piston to define a 180° phase difference between a crank throw of the first piston and a crank throw of the second piston, the crankshaft being drivably coupled to the first piston and the second piston to alternatively displace the first portion of the first fluid from the first fluid chamber into the second combustion chamber and displace the second portion of the first fluid from the second fluid chamber into the first combustion chamber.

7. The gas generator of claim 6, further comprising:
a third piston cylinder for housing a third piston for reciprocating motion therein, a third combustion chamber and a third fluid chamber being formed on opposed sides of the third piston inside the third piston cylinder; and
a fourth piston cylinder for housing a fourth piston for reciprocating motion therein, a fourth combustion chamber and a fourth fluid chamber being formed on opposed sides of the fourth piston inside the fourth piston cylinder, the third fluid chamber being fluidly connected to the fourth combustion chamber, and the fourth fluid chamber being fluidly connected to the third combustion chamber,
and wherein the crankshaft is connected to the third piston and the fourth piston to define a 180° phase difference between a crank throw of the third piston and a crank throw of the fourth piston, the crankshaft being drivably coupled to the third piston and the fourth piston to alternatively displace a third portion of the first fluid from the third fluid chamber into the fourth combustion chamber and displace a fourth portion of the first fluid from the fourth fluid chamber into the third combustion chamber.

8. The gas generator of claim 1, further comprising:
one or more valves connected to the supply of the first fluid and the supply of the second fluid to draw in the first portion of the first fluid into the first fluid chamber, the second portion of the first fluid into the second fluid chamber, the first portion of the second fluid into the first combustion chamber, and the second portion of the second fluid into the second combustion chamber.

9. The gas generator of claim 8, wherein the one or more valves are configured to hinder reverse flow to the supply of the first fluid from the first fluid chamber and the second fluid chamber.

10. The gas generator of claim 8, wherein the one or more valves include
a first one-way valve to allow the first fluid from the first fluid chamber into the second combustion chamber and to hinder flow from the second combustion chamber to the first fluid chamber; and
a second one-way valve to allow the first fluid from the second fluid chamber into the first combustion chamber and to hinder flow from the first combustion chamber to the second fluid chamber.

11. A system of generating power, comprising:
a gas generator as defined in claim 1;
a reservoir including liquid $CO_2$; and
an expander fluidly connected to the gas generator to receive the gas expelled from the first combustion chamber and the second combustion chamber to generate shaft power using the gas, the expander fluidly connected to the reservoir to supply fluids exhausted from the expander to the reservoir.

12. The system of generating power of claim 11, further comprising:
a heat exchanger configured to receive fluids exhausted from the expander for cooling the fluids to generate liquid $CO_2$ to be supplied to the reservoir.

13. The system of generating power of claim 11, further comprising:
a booster combustion chamber fluidly connected to the gas generator to receive and heat the gas expelled from the first combustion chamber and the second combustion chamber, the booster combustion chamber fluidly connected to the expander to supply heated gas for generating power, the booster combustion chamber supplied with hydrocarbon fuel and oxygen for combustion to heat the gas.

14. The system of generating power of claim 13, further comprising:
a heat exchanger configured to receive fluids exhausted from the expander for cooling the fluids to generate liquid $CO_2$ to be supplied to the reservoir, the gas expelled from the first combustion chamber and the second combustion chamber being preheated using heat from the heat exchanger before being supplied to the booster combustion chamber.

15. The system of generating power of claim 11, wherein the reservoir is configured to separate liquid $CO_2$ from gaseous $CO_2$ by density stratification.

16. The system of generating power of claim 11, wherein the first fluid is $CO_2$ and the supply of the first fluid is the reservoir.

17. The system of generating power of claim 11, wherein the expander is a first expander, further comprising:
a second expander fluidly connected to the reservoir to receive $CO_2$ therefrom to relieve excess pressure in the reservoir and to generate power.

18. The system of generating power of claim 17, further comprising:
a fuel reservoir, the second fluid including fuel from the fuel reservoir, the power generated by the second expander being used to pressurize the fuel in the fuel reservoir.

19. A system for generating power, comprising:
a reservoir including liquid $CO_2$;
a gas generator including
a fluid chamber supplied with liquid $CO_2$,
a combustion chamber supplied with liquid $CO_2$, hydrocarbon fuel, and oxygen for combustion to generate pressurized gas including gaseous $CO_2$,
a piston actuatable by combustion in the combustion chamber to cause reciprocating motion of the piston to displace liquid $CO_2$ out of the fluid chamber; and an expander fluidly connected to the gas generator to receive the pressurized gas from the gas generator and fluidly connected to the reservoir to supply fluids exhausted from the expander to the reservoir, the expander configured to generate power using the pressurized gas.

20. The system for generating power of claim 19, wherein the fluid chamber is a first fluid chamber, the combustion chamber is a first combustion chamber, the piston is a first piston, and the gas generator further includes:
a second fluid chamber,
a second combustion chamber supplied with liquid $CO_2$ from the first fluid chamber, hydrocarbon fuel, and oxygen for combustion to generate pressurized gas including gaseous $CO_2$, and
a second piston actuatable by combustion in the second combustion chamber to cause reciprocating motion to displace liquid $CO_2$ out of the second fluid chamber into the first combustion chamber.

21. The system for generating power of claim 19, further comprising:
a heat exchanger configured to receive fluids exhausted from the expander for cooling to generate liquid $CO_2$ to be supplied to the reservoir.

22. The system for generating power of claim 19, further comprising:
a booster combustion chamber fluidly connected to the gas generator to receive pressurized gas and fluidly connected to the expander to supply heated pressurized gas for generating power, the booster combustion chamber supplied with hydrocarbon fuel and oxygen for combustion to heat the pressurized gas received from the gas generator.

23. A method of generating gas, comprising:
receiving hydrocarbon fuel and oxygen in a first combustion chamber;
receiving liquid $CO_2$ in the first combustion chamber to mix the liquid $CO_2$ with the hydrocarbon fuel and the oxygen;
receiving liquid $CO_2$ in a first fluid chamber;
causing combustion of the hydrocarbon fuel in the first combustion chamber using the oxygen in the first combustion chamber to vaporize the liquid $CO_2$ in the first combustion chamber and to generate a first portion of combustion gases for mixing with vaporized $CO_2$ in the first combustion chamber to generate a first portion of mixed working fluid;
actuating a first piston by combustion in the first combustion chamber to push liquid $CO_2$ from the first fluid chamber into a second combustion chamber;
receiving hydrocarbon fuel and oxygen in the second combustion chamber to mix the hydrocarbon fuel and the oxygen in the second combustion chamber with the liquid $CO_2$ in the second combustion chamber;
receiving liquid $CO_2$ in a second fluid chamber;
causing combustion of the hydrocarbon fuel in the second combustion chamber using the oxygen in the second combustion chamber to vaporize the liquid $CO_2$ in the second combustion chamber and to generate a second portion of combustion gases for mixing with vaporized $CO_2$ in the second combustion chamber to generate a second portion of mixed working fluid; and
actuating a second piston by combustion in the second combustion chamber to push liquid $CO_2$ from the second fluid chamber into the first combustion chamber.

24. The method of generating gas of claim 23, wherein the first piston and the second piston are integrally coupled to each other.

25. The method of generating gas of claim 23, wherein the first piston and the second piston are coupled to each other by a crankshaft.

* * * * *